US008644312B2

(12) United States Patent
Birze et al.

(10) Patent No.: US 8,644,312 B2
(45) Date of Patent: *Feb. 4, 2014

(54) SYSTEM, METHOD, AND COMPUTER-READABLE MEDIUM FOR DYNAMIC DEVICE DISCOVERY FOR SERVERS BINDING TO MULTIPLE MASTERS

(75) Inventors: Brigitte Bernadette Birze, Oak Point, TX (US); Mark Ethard Smith, Garland, TX (US); Joel Shane Dick, Dallas, TX (US)

(73) Assignee: AMX LLC, Richardson, TX (US)

( * ) Notice: Subject to any disclaimer, the term of this patent is extended or adjusted under 35 U.S.C. 154(b) by 57 days.

This patent is subject to a terminal disclaimer.

(21) Appl. No.: 13/487,345

(22) Filed: Jun. 4, 2012

(65) Prior Publication Data
US 2012/0245708 A1 Sep. 27, 2012

Related U.S. Application Data

(63) Continuation of application No. 12/344,732, filed on Mar. 2, 2009, now Pat. No. 8,194,660, which is a continuation-in-part of application No. 11/636,918, filed on Dec. 11, 2006, now abandoned, which is a continuation-in-part of application No. 11/222,885, filed on Sep. 9, 2005, now abandoned.

(60) Provisional application No. 60/608,439, filed on Sep. 9, 2004.

(51) Int. Cl.
*H04L 12/28* (2006.01)
*H04L 12/56* (2011.01)

(52) U.S. Cl.
USPC ........... 370/390; 370/362; 370/389; 370/410; 370/432; 370/522; 700/3; 700/19; 700/20

(58) Field of Classification Search
None
See application file for complete search history.

(56) References Cited

U.S. PATENT DOCUMENTS

| 6,615,088 | B1 * | 9/2003 | Myer et al. ...................... 700/20 |
| 6,763,040 | B1 * | 7/2004 | Hite et al. ...................... 370/522 |
| 2005/0083905 | A1 * | 4/2005 | Nishida et al. ................ 370/351 |
| 2007/0055390 | A1 * | 3/2007 | Simon et al. .................... 700/19 |

* cited by examiner

*Primary Examiner* — Jae Y Lee

(57) ABSTRACT

A system that facilitate broadcast of a device discovery beacon by a dynamic physical device wishing to bind to one or more control systems are provided. If the dynamic physical device comprises of server that is configured to bind to multiple master controllers, the dynamic physical device may include a device Type Flag and set the value of the device Type Flag to indicate the dynamic physical device comprises a server. On detection of the beacon, a master controller evaluates the device Type Flag if it is present in the device discovery beacon. If the device Type Flag is present and indicates the dynamic physical device comprise a server which may bind to multiple master controllers, the master controller may automatically load a device Module for the dynamic physical device and commence commutations with the dynamic physical device with no manual intervention.

20 Claims, 22 Drawing Sheets

SYSTEM, METHOD, AND COMPUTER-READABLE MEDIUM FOR DYNAMIC DEVICE DISCOVERY FOR SERVERS BINDING TO MULTIPLE MASTERS

CROSS REFERENCE TO RELATED APPLICATIONS

This application is a continuation of and claims priority to U.S. patent application Ser. No. 12/344,732, entitled "SYSTEM, METHOD, AND COMPUTER-READABLE MEDIUM FOR DYNAMIC DEVICE DISCOVERY FOR SERVERS BINDING TO MULTIPLE MASTERS", filed Mar. 2, 2009, now issued U.S. Pat. No. 8,194,660, issued on Jun. 5, 2012 which in turn is a continuation-in-part of patent application Ser. No. 11/636,918, entitled "METHOD, SYSTEM AND COMPUTER PROGRAM USING STANDARD INTERFACES FOR INDEPENDENT DEVICE CONTROLLERS", filed Dec. 11, 2006, now abandoned which is a continuation-in-part of patent application Ser. No. 11/222,885, entitled "METHOD, SYSTEM AND COMPUTER PROGRAM USING STANDARD INTERFACES FOR INDEPENDENT DEVICE CONTROLLERS", filed Sep. 9, 2005, now abandoned which claims the benefit of the earlier filing date of U.S. provisional patent application Ser. No. 60/608,439, filed Sep. 9, 2004. This application is also related to U.S. provisional patent application Ser. No. 61/017,628, entitled, "Dynamic Device Discovery for Servers Binding to Multiple Masters", filed Dec. 29, 2007, and U.S. Provisional patent application Ser. No. 61/017,620, entitled, "Server Enabled Device Description", filed Dec. 29, 2007, the disclosures of which are incorporated in its entirety herein by reference.

FIELD OF THE INVENTION

The present invention is generally related to control systems and, more particularly, to mechanisms for dynamic device discovery for servers binding to multiple master controllers.

BACKGROUND OF THE INVENTION

Many systems, such as control systems, monitoring systems, and the like (collectively referred to herein as control systems), exist that allow the discovery of devices in the control system. However, contemporary mechanisms utilize discovery protocols that allow a device to bind to only a single master.

Conventional discovery and static binding routines require an administrator to make an explicit, manual choice of which master controller a device is bound. Some mechanisms provide an auto-bind option that facilitates a master controller to automatically bind to any device which matches a dynamic application device maintained by the master controller. However, contemporary auto-bind mechanisms may cause catastrophic, undefined results when multiple master controllers attempt to bind to the same physical device, e.g., physical devices that are not configured to be bound to multiple master controllers. Accordingly, static binding mechanisms are preferred in conventional systems when multiple master controllers are listening to the same multicast address for a common device type.

Numerous systems exist, such as Remote Monitoring Systems (RMSs), which include servers that must bind to multiple master controllers. Static binding mechanisms are typically employed if multiple masters monitor a common multicast address to avoid binding of devices to multiple controllers even if servers are deployed that must bind to multiple masters. Consequently, an administrator must disadvantageously manually bind the servers to each of the master controllers.

Therefore, what is needed is a device discovery mechanism that allows servers to automatically bind to multiple master controllers without collisions, thereby overcoming the need to manually bind each master controller.

SUMMARY OF THE INVENTION

The present invention provides a system, method, and computer readable medium for dynamic device discovery and binding of servers to multiple master controllers. A device discovery beacon that includes a device Type Flag may be broadcast by a dynamic physical device. If the dynamic physical device comprises a server that is configured to bind to multiple master controllers, the dynamic physical device sets the value of the device Type Flag to indicate the dynamic physical device comprises a server. On detection of the beacon, a master controller configured according to disclosed embodiments may evaluate the device Type Flag. Upon determining the device Type Flag indicates the dynamic physical device comprise a server, the master controller may load a device Module for the dynamic physical device and commence communications with the dynamic physical device. In this instance, the master controller advantageously does not broadcast a binding notification thereby allowing other master controllers to bind with the same dynamic physical device.

In one embodiment of the disclosure, a method of binding a system server device to a controller is provided. The method includes receiving, by a first master controller, a first device discovery beacon from a first system server device, evaluating the beacon for inclusion of a device type flag, determining the beacon includes the device type flag, evaluating a value of the device type flag, determining the value indicates the first system server device comprises a server configured to bind to multiple master controllers, and loading, by the first master controller, an instance of a device module associated with the first system server device responsive to determining the value indicates the device comprises a server configured to bind to multiple master controllers.

In a further embodiment of the disclosure, a computer-readable medium having computer-executable instructions for execution by a processing system, the computer-executable instructions for binding a system server device to a controller is provided. The computer-readable medium comprises instructions that, when executed, cause the processing system to receive, by a first master controller, a first device discovery beacon from a first system server device, evaluate the beacon for inclusion of a device type flag, determine the beacon includes the device type flag, evaluate a value of the device type flag, determine the value indicates the system server device comprises a server configured to bind to multiple master controllers, load, by the first master controller, an instance of a device module associated with the first system server device responsive to determining the value indicates the device comprises a server configured to bind to multiple master controllers, and commence communication and control of the first system server device by the first master controller responsive to loading the instance of the device module.

In a further embodiment of the disclosure, a system for binding a control system device to a controller is provided. The system comprises a first dynamic physical device comprising a server configured to bind to multiple master controllers, a first master controller communicatively coupled with the first dynamic physical device and having a first instance of a dynamic application device corresponding to the first dynamic physical device, and a second master controller communicatively coupled with the first dynamic physical device and having a second instance of the dynamic application device corresponding to the first dynamic physical device. The first dynamic physical device broadcasts a first device discovery beacon including a device type flag having a value that indicates the first dynamic physical device comprises a server. The first master controller and the second master controller receive the first device discovery beacon and respectively evaluate the device type flag value. The first master controller loads a first instance of a device module associated with the first dynamic physical device responsive to determining the value indicates the first dynamic physical device comprises a server, and the second master controller loads a second instance of the device module responsive to determining the value indicates the first dynamic physical device comprises a server.

BRIEF DESCRIPTION OF THE DRAWINGS

Aspects of the present disclosure are best understood from the following detailed description when read with the accompanying figures, in which.

DETAILED DESCRIPTION OF THE INVENTION

It is to be understood that the following disclosure provides many different embodiments or examples for implementing different features of various embodiments. Specific examples of components and arrangements are described below to simplify the present disclosure. These are, of course, merely examples and are not intended to be limiting.

I. Duet Overview

Figure 1:
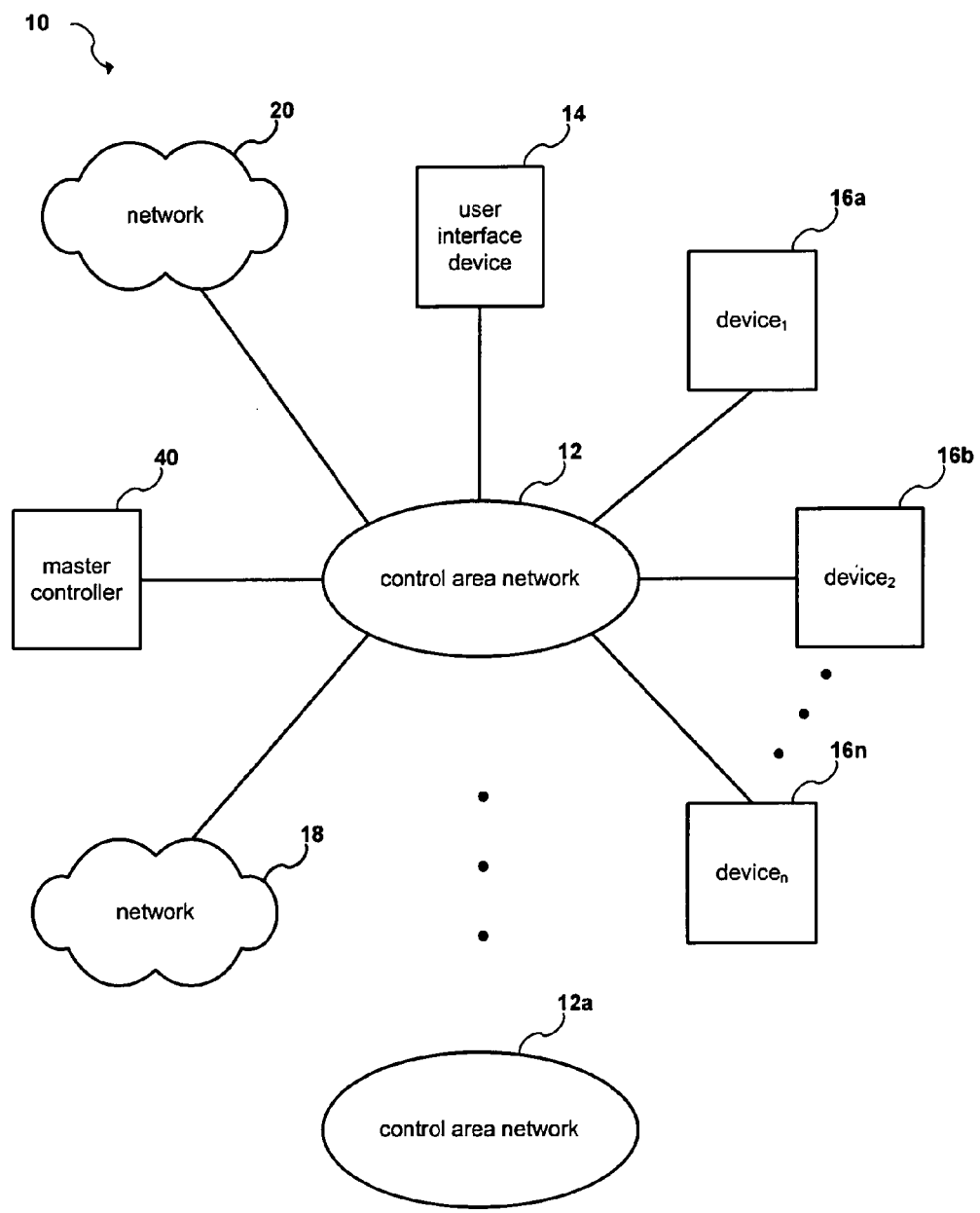
FIG. 1 is a simplified top-level block diagram of a control system configuration according to an embodiment of the present invention.

Referring to FIG. 1, a simplified top-level block diagram of a control system 10 configuration according to an embodiment of the present invention is shown. One or more devices 16a-16n in the control system 10 can send control commands to and/or receive control messages from a master controller 40 on one or more control area networks 12 and 12a. The present invention includes common application programming interfaces (APIs) that are used to represent the one or more devices 16a-16n. The one or more devices 16a-16n may be wholly unrelated in technology. Therefore, the common APIs represent the one or more devices 16a-16n by defining a structure whereby different device technologies are grouped together into classes by common operation and/or functionality from the general to the specific. Thus, different classes are used to represent different groups and subgroups of technology for the one or more devices 16a-16n. For instance, a class may represent all home entertainment devices, such as VCR, television, CD and DVD. Another class may represent specifically all brands of VCRs and another class may represent a particular brand/vendor of the VCR. The present invention recognizes that even devices that are wholly unrelated in technology may share common functionality. For instance, a DVD, TIVO, VCR, LD and Cassette Deck each share the functional ability of playing some form of media. Thus, common APIs are used to abstract the operational and/or functional capabilities of the one or more devices 16a-16n, such that applications may communicate with the one or more devices 16a-16n without concern for the underlying technology and/or proprietary protocols of the devices.

Control system 10 includes one or more control area networks (CAN) 12 and 12a. Control area networks 12 and 12a are local area networks used to interconnect a variety of devices 16a-16n, user interface device 14 and master controller 40. Optionally, the control area network may be used to interconnect other networks 18 and 20, such as a proprietary network, local area network, an Intranet, or the Internet. Control area networks 12 and 12a may be used to interconnect multiple disparate protocols. For instance, a Microsoft UPnP (Universal Plug and Play) network may be interconnected to a Sun Microsystems JINI network via control area networks 12 and 12a. Devices 16a-16n include, but are not limited to, physical and logical devices, equipment, and appliances. The underlying network may be wired, wireless, power line carriers, or any suitable transmission medium. Some devices may be coupled to control area networks 12 and 12*a* via additional intermediate communications devices such as an RS 232 controller (not shown).

User interface device 14 is any device that is capable of receiving user input and displaying or indicating control network status. For example, a touch panel, a computer terminal with a monitor, keyboard and pointing device, and any device with similar functionalities may serve as user interface device 14. In addition, a user interface is any device that is capable of receiving user input such as a simple push button keypad, which may not have indicators for feedback, or an Infra-red remote control.

Master controller 40 generally includes a CPU-based controller that controls the communications among user interface device 14 and devices 16*a*-16*n*. It is operable to receive user inputs received by user interface devices, such as commands, and instruct the appropriate device 16*a*-16*n* to act according to the command. Master controller 40 may also poll each device in control area network 12 periodically to monitor its status. The system status and/or the status of each device may be sent to user interface device 14 for display. The devices 16*a*-16*n*, user interface devices 15 and master controllers 40 may also be configured to handle dynamic device discovery within control system 10.

Devices 16*a*-16*n* are configured to receive commands from master controller 40 and operate or act according to the command. Devices 16*a*-16*n* may include equipment that affect or monitor the various parameters of the premises. For example, devices 16*a*-16*n* may include heating and air conditioning, lighting, video equipment, audio equipment, sprinklers, security cameras, infrared sensors, smoke detectors, or other similar device in a residential or commercial control area network 12. Devices 16*a*-16*n* may also be household appliances, such as a hot tub, fireplace, microwave oven, coffee maker, or other similar device that are capable of providing a current status of its operational state to master controller 40, such as on/off, temperature settings, current ambient temperature, light intensity settings, volume settings, threshold settings, and predetermined alphanumeric strings reflective of operational states. Further, devices 16*a*-16*n* may represent a logical device, such as another control system 10 or a virtual device. In one embodiment, a virtual device may be configured to represent multiple physical devices.

Figure 2:
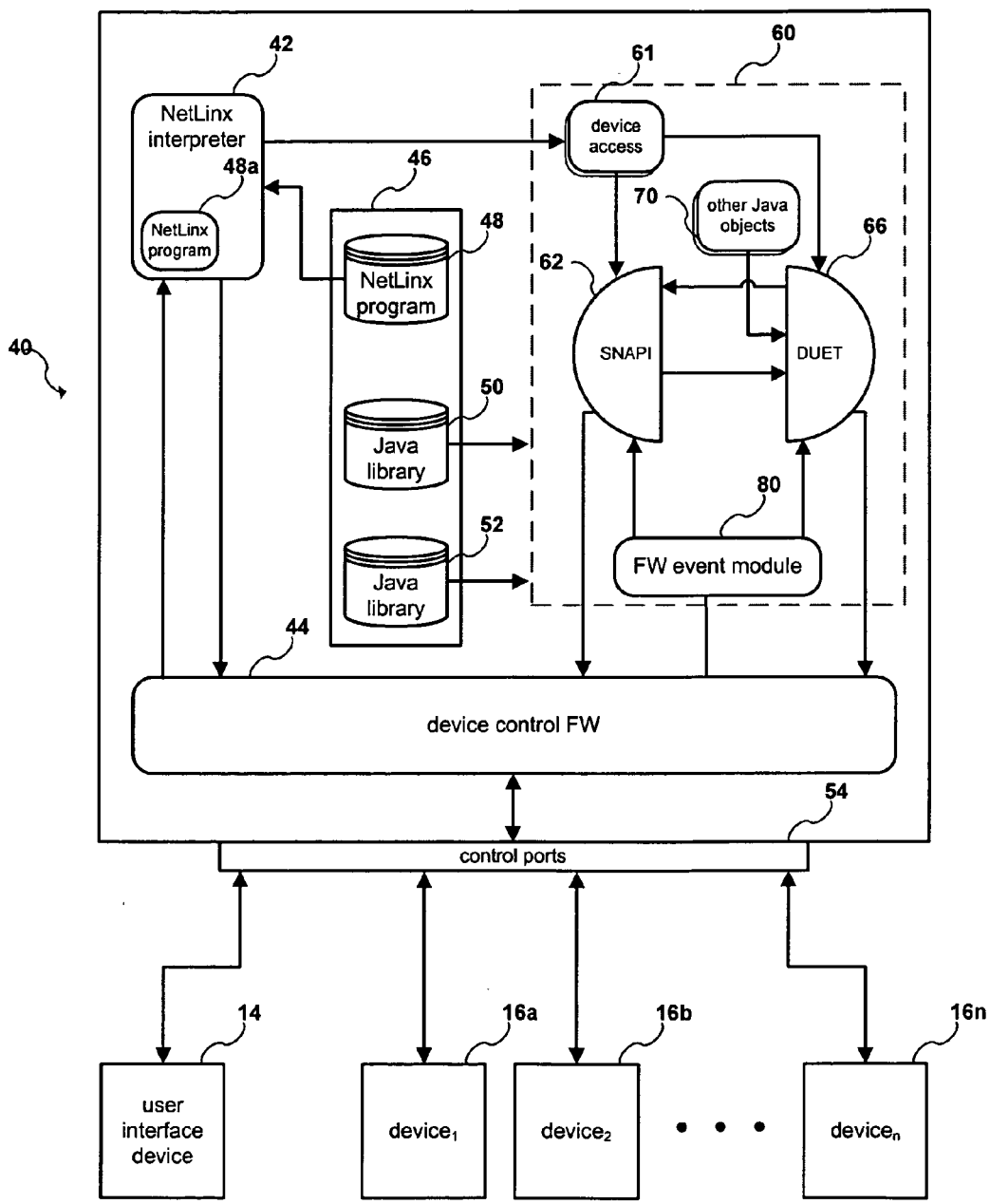
FIG. 2 is a block diagram illustrating the components of a master controller according to an embodiment of the present invention.

Referring to FIG. 2, a block diagram illustrating the components of a master controller 40 according to an embodiment of the present invention is shown. Master controller 40 includes, but is not limited to, device control firmware 44, a NetLinx interpreter 42 executing a NetLinx program 48*a*, memory area 46, one or more control ports 54 and a Java virtual machine 60. One or more devices 16*a*-16*n* and user interface device 14 are connected to master controller via control ports 54, or other input means (not shown). Memory Area 46 includes a NetLinx program 48 that is executed as NetLinx program 48*a* by NetLinx interpreter 42, and one or more Java libraries 50 and 52 that are used by the Java virtual machine 60. The one or more Java libraries 50 and 52 may be dynamically loaded and/or updated with new methods while the Java virtual machine 60 is executing. The Java libraries 50 and 52 may be either a standard Java Archive (JAR) file or an Open Service Gateway Initiative (OSGi) bundle. An OSGi bundle is a JAR (.jar) file with a manifest file (.mf) listing the services that are exported by the bundle (via a package name) as well as any service that the bundle itself requires for execution. Within the OSGi framework every bundle has a pre-defined lifecycle.

Figure 3:
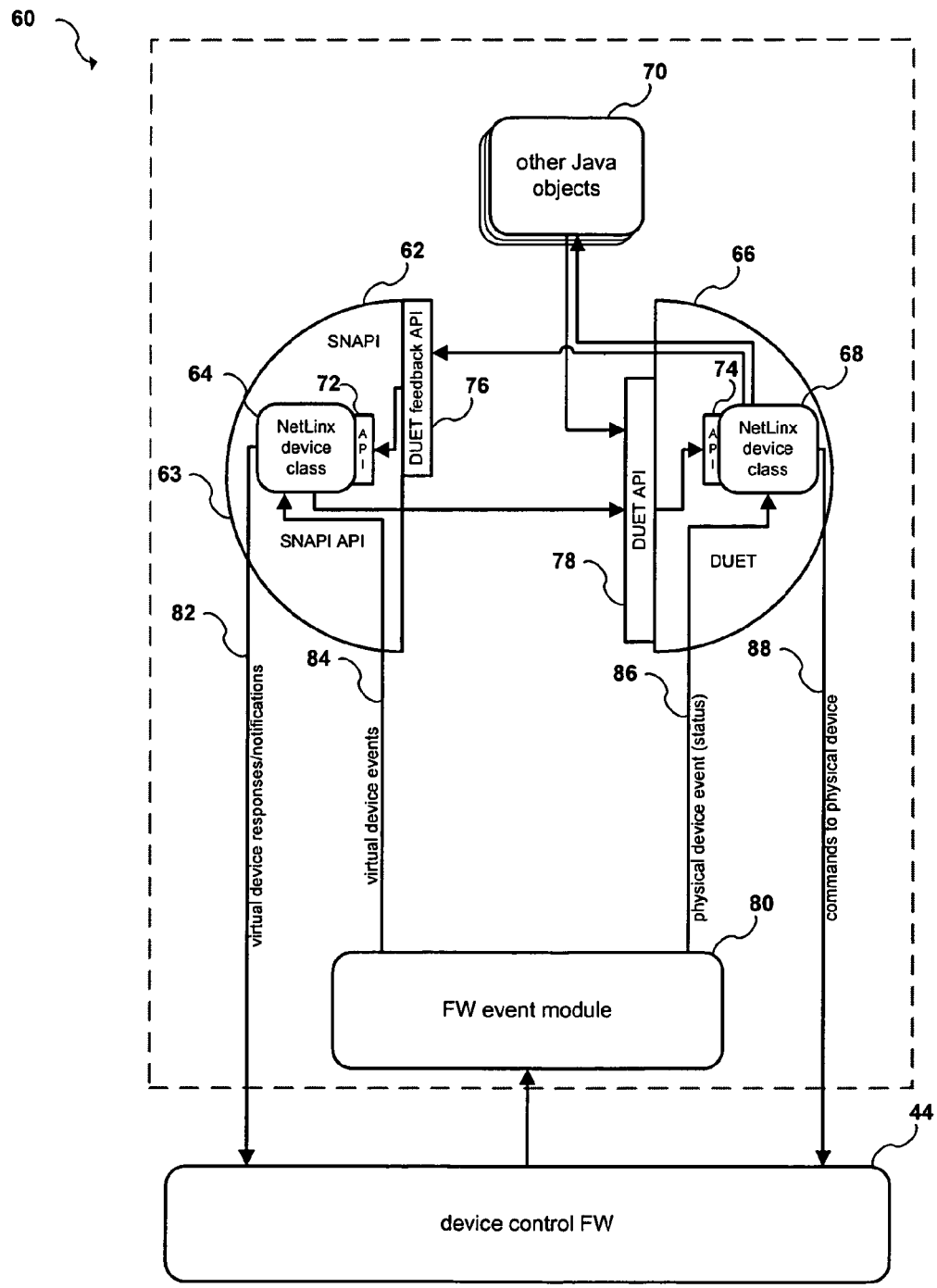
FIG. 3 is a block diagram illustrating a standard interface device controller configuration according to an embodiment of the present invention.

Referring to FIG. 3, a block diagram illustrating a standard interface device controller configuration according to an embodiment of the present invention is shown. The Java virtual machine 60 includes a firmware event module 80, a router (referred to as a "SNAPI object") 62, DUET object 66, and optionally one or more other Java objects 70. In one embodiment, the DUET object 66 is dynamically loaded and/or updated from one or more Java libraries 50 and 52. In this case, the one or more Java libraries 50 and 52 are referred to as "DUET modules" since they represent the uninstantiated DUET objects 66.

Generally, the DUET object 66 provides services to translate between a set of device specific API calls and a device's proprietary protocol, thereby hiding the proprietary protocol from the service user. For example, a DUET object 66 that is communicating with a VCR that uses a proprietary serial protocol might provide PLAY, STOP, PAUSE, FFW and REWIND services via the DUET API 78. The DUET object 66 generates the necessary serial protocol data and communicates with the VCR. Any object having access to the DUET object 66 could invoke a DUET API 78 method to affect change on the physical VCR with no knowledge of the underlying protocol.

The DUET object 66 contains a majority of the translation between a standard API and the proprietary protocol of the one or more devices 16*a*-16*n*. For instance, the DUET object 66 contains a majority of the translation between the standard API and the proprietary protocol for a manufacturer's brand of a particular physical device. The DUET object 66 may include one or more NetLinx device class 68 objects each having a NetLinx API 74, and a standard DUET API 78 grouped into device categories. The DUET API 78 device categories include, but are not limited to, a switcher, an A/V receiver, a plasma monitor, a video projector, a television, a digital satellite system (DSS), a set top box, a disk device, a DVR/PVR, a digital media player, a VCR, a video conferencer, an audio conferencer, an audio tuner, a cassette deck, a level controller, a pre-amplifier, a audio processor, a camera, a document camera, a slide projector, lights, an HVAC, a security system, a weather device, a pool or spa, and a lift/screen/shade/window/door. Each DUET API 78 device category includes a standard API that is specific to that device category. For instance, the DUET API 78 may include play ( ), stop ( ), pause ( ), fw ( ) and rewind ( ) methods that correspond to VCR devices.

The DUET object 66 communicates with the SNAPI object 62, the FW event module 80 and, optionally, one or more other Java objects 70. The DUET object 66 implements a standard DUET API 78. The SNAPI object 62 communicates with the DUET object 66 by invoking methods specific to device categories in the standard DUET API 78 of the DUET object 66. One or more NetLinx device class 68 objects will then execute the necessary device specific processing for a specific task. The NetLinx device class 68 encapsulates the communication protocols necessary to communicate with a specific device or equipment controlling device (e.g., a single DPS (device:port:system)). The NetLinx device class 68 API includes, but is not limited to, on ( ), off ( ), send_level ( ) and send_string ( ) methods. For example, a play ( ) method on an IR controlled VCR would request the underlying physical device (IR emitter) to send IR pulses to a VCR, thereby resulting in a play operation on the VCR. However, not all DUET objects 66 will have a NetLinx device class 68. Access to one or more devices 16*a*-16*n* may also be through some other Java enabled transport (e.g., TCP/IP sockets), instead of a NetLinx device class 68.

The one or more devices 16*a*-16*n* indirectly communicate with the DUET object 66 using event handlers. In particular, the one or more devices 16*a*-16*n* communicate with the device control firmware 44, the device control firmware 44 routes any communication to the FW event module 80, and the FW event module 80 posts events to pass this communication to a NetLinx device class 68 of the DUET object 66. The DUET NetLinx device class 68 includes, but is not limited to, a IChannelListener interface, a IButtonListener interface, a ILevelListener interface, a IDataListener interface and a ICustomListener interface, each having one or more corresponding event handler methods to catch the event posted by the FW event module 80. The IButtonListener handles button push and release events. The IChannelListener handles channel on and off events. The ILevelListener handles level events. The IDataListener handles string, command, online and offline events. The ICustomListener is a catch-all for all other types of events. A DUET NetLinx device class 68 only implements those interfaces that it needs. The DUET object 66 processes device events by translating proprietary event data into a status object that is understood by the SNAPI object 62 along with any other entity, such as other Java objects 70, listening for events from one or more devices 16a-16n. Entities that wish to receive device events register as a listener with the DUET object 66. When an event occurs, the event data is packaged into a status object and a predefined handler routine is called for each of the registered listeners.

A DUET object 66 does not necessarily have its own processing thread. For instance, a DUET object 66 utilizing a NetLinx device class 68 object as its connect to one or more devices 16a-16n will most likely not have its own thread. Instead, its 'receive' thread is provided by an underlying event router thread that is receiving data from the firmware event module 80. Whereas, a DUET object that communicates with one or more devices 16a-16n via a TCP/IP socket must provide a separate thread of execution as a listener to the TCP/IP socket.

A SNAPI object 62 is the inverse of a DUET object 66. The SNAPI object 62 processes data coming into the JVM in a proprietary format and translates it into calls made into a DUET object 66. The SNAPI object 62 is configured to indirectly communicate with a NetLinx program 48a. The SNAPI object 62 may include one or more NetLinx device class 64 objects each having a NetLinx API 72, and a standard DUET feedback API 76. The SNAPI object 62 communicates with both the DUET object 66 and the FW event module 80. The NetLinx program 48a indirectly communicates with the SNAPI object 62 using event handlers. In particular, the NetLinx program 48a communicates with the device control firmware 44, the device control firmware 44 routes any communication to the FW event module 80, and the FW event module 80 posts events to pass this communication to a NetLinx device class 64 of the SNAPI object 62. Similar to the DUET NetLinx device class 68, the SNAPI NetLinx device class 64 includes, but is not limited to, a IChannelListener interface, a IButtonListener interface, a ILevelListener interface, a IDataListener interface and a ICustomListener interface, each having one or more corresponding event handler methods to catch the event thrown by the FW event module 80.

Optionally, a DUET object 66 may expose multiple DUET APIs 78 in order to represent a device 16a-16n having combination functionality. For example, if a DUET object 66 controls a combination VCR/DVD player device 16a, the DUET object 66 could expose a VCR DUET API 78 and a DVD DUET API 78. Thereby, Java objects 70 would have access to the VCR functionality of the combination VCR/DVD player device 16a by invoking methods in the VCR DUET API 78 and access to the DVD functionality of the combination VCR/DVD player device 16a through the DVD DUET API 78.

Optionally, a single DUET object 66 may also serve as a controller for multiple physical devices 16a-16n, thereby creating a new abstract device. For example, a DUET object 66 could represent a matrix or library of VCR devices 16a-16n by having multiple NetLinx device class objects 68, each controlling a different physical VCR device 16a-16n.

Figure 4:
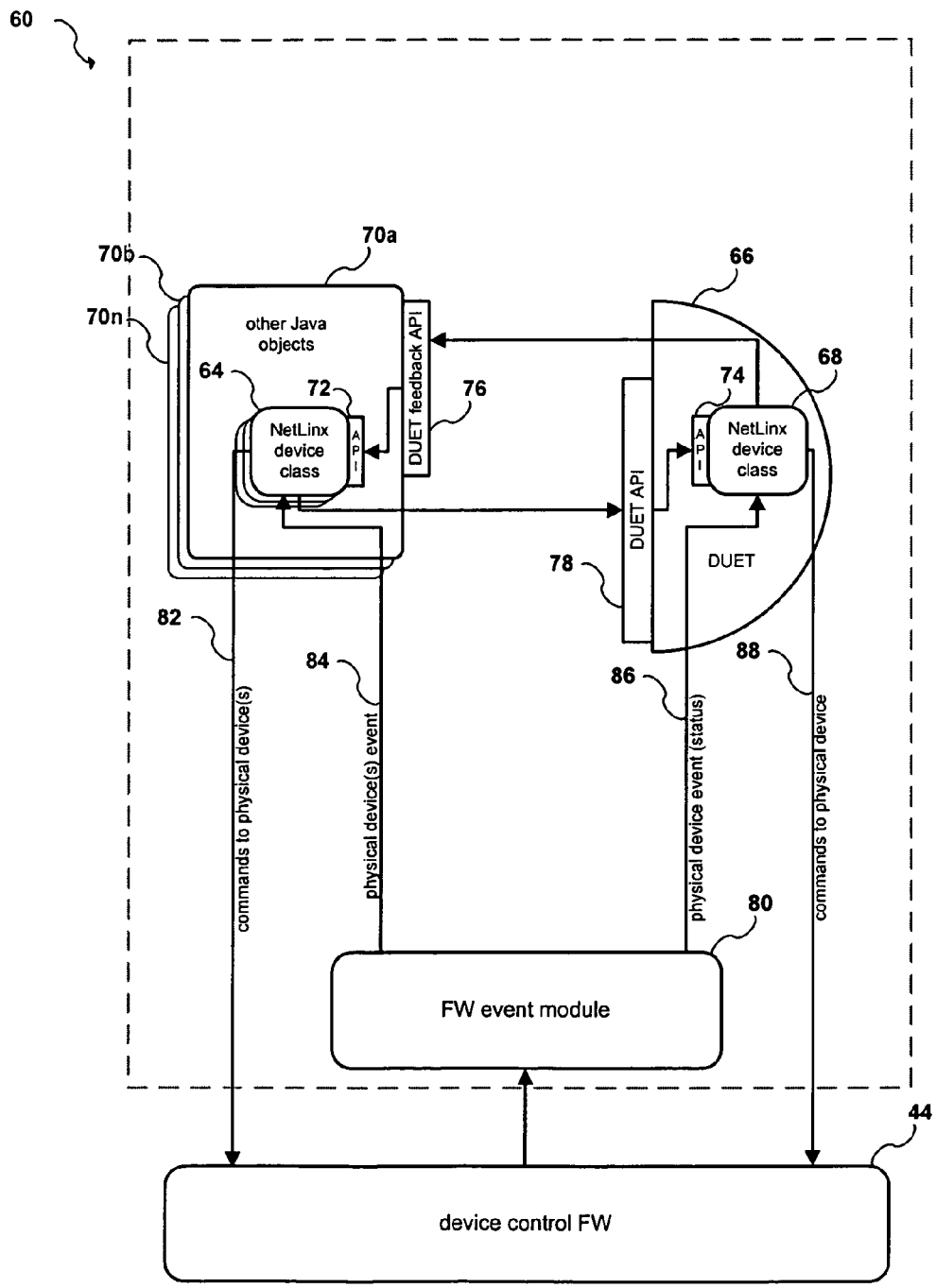
FIG. 4 is a block diagram illustrating another standard interface device controller configuration according to an embodiment of the present invention.

Referring to FIG. 4, a block diagram illustrating another standard interface device controller configuration according to an embodiment of the present invention is shown. In this embodiment, one or more of the other Java objects 70 is a router object 70a that may include a NetLinx device class 64 having a NetLinx API 72. The router object 70a has similar functionality as the SNAPI object 62 previously described, but is configured to communicate directly with Java programs using Java methods.

As shown in FIGS. 3 and 4, multiple Java objects 70a-70n (FIG. 4) or 70 (FIG. 3) may communicate with a single DUET object 66 and its associated one or more devices 16a-16n by invoking methods in the standard DUET API 78 of the DUET object 66. For example, a Java object 70a that controls a touchpanel and a Java object 70b that controls a keypad may both communicate with a particular VCR device 16a which is controlled through a single DUET object 66. In this instance, both Java objects 70a and 70b could invoke DUET API 78 method(s) to affect changes on the physical VCR device 16a. Similarly, both Java objects 70a and 70b would be notified of changes on the VCR device 16a through their respective DUET feedback APIs 76.

The configuration as shown in FIG. 3 may be used to communicate with a NetLinx program 48a whereas the configuration as shown in FIG. 4 may be used to communicate with existing and future generations of Java enabled devices. Optionally, the configurations shown as in FIGS. 3 and 4 may co-exist simultaneously in the same control system 10, such that Java programs and NetLinx programs may co-exist within the same control system 10.

II. Duet System Processing

Figure 5:
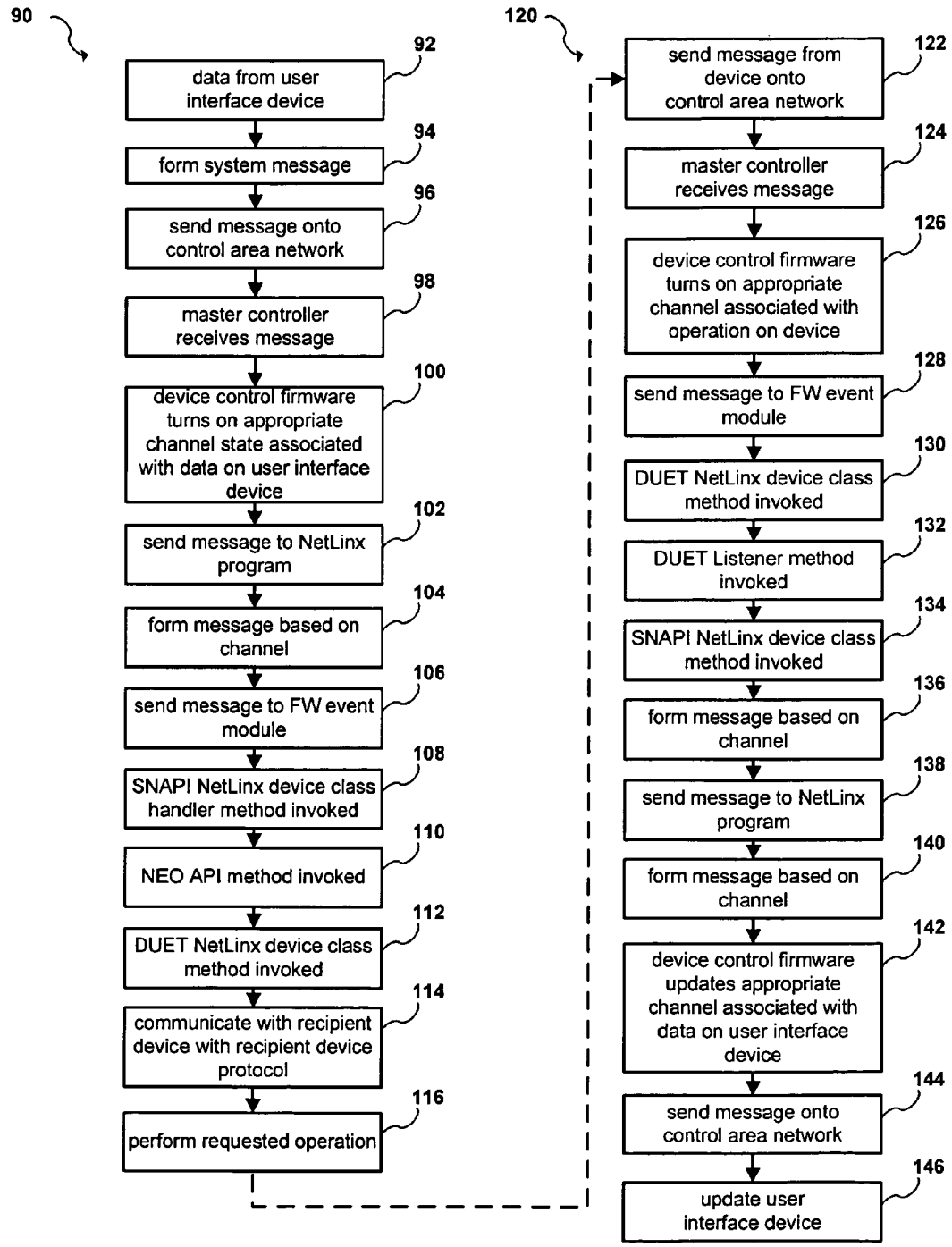
FIG. 5 is a flow chart illustrating command processing using a standard interface device controller according to an embodiment of the present invention.

Referring to FIG. 5, a flow chart illustrating command processing using a standard interface device controller according to an embodiment of the present invention is shown. As shown at block 92, data is generated from a user interface device 14 that will be communicated to one or more devices 16a-16n. Data may be generated from the user interface device 14 by the user entering an alphanumeric string, clicking on a button icon on a graphical user interface, pushing a button on a touch panel, or other suitable input. The user interface device 14 then forms a control system message including, but not limited to, a channel associated with the data and/or the sender of the message, as shown at block 94. Each of the one or more devices 16a-16n, both sender and recipient devices, are uniquely identified by a DPS (device:port:system) value. A channel is a number uniquely identifying each addressable operation, component or graphical element of each device 14 and 16a-16n. For instance, each button icon on a graphical user interface of the user interface device 14 is assigned a unique channel number. Further, the play, stop and rewind operation on a VCR device 16a-16n are each assigned unique channel numbers. The message is then sent onto the control area network 12, as shown at block 96. As shown at block 98, the master controller 40 on that network receives the message via one or more control ports 54. Control ports 54 include, but are not limited to, Infrared (IR) ports, serial ports, relays and digital I/O.

A channel state associated with the origin of the data (e.g., a particular button pressed on user interface device 14) is turned ON by the device control FW 44 to indicate that the channel is on, as shown at block 100. A message incorporating the channel number and the sender of the message is then sent to a NetLinx program 48a executed by a NetLinx interpreter 42, as shown at block 102. As shown at block 104, the NetLinx program 48a determines the appropriate action based on the channel number. Based on that action, the NetLinx program 48a forms a message including the appropriate recipient and a channel number uniquely identifying an operation on the recipient device 16a-16n. The message is sent via device control firmware 44 to FW event module 80 within the Java virtual machine 60, as shown at block 106. As shown at block 108, based on the recipient and channel number, an appropriate event handler method is invoked within a NetLinx device class 64 of the SNAPI object 62. The event handler method invokes one or more DUET APIs 78 having standard API methods that correspond to one or more operations on the recipient device 16a-16n, as shown at block 110. An appropriate method within a DUET NetLinx device class 68 is then invoked by the DUET API 78, as shown at block 112. The DUET NetLinx device class 68 method then communicates the requested operation to the recipient device 16a-16n using the recipient's device protocol, as shown at block 114. As shown at block 116, the requested operation is thereby performed on the recipient device 16a-16n.

Depending on the recipient device 16a-16n and the requested operation, the recipient device 16a-16n may or may not send a response message onto control area network 12. If the recipient device 16a-16n does send a response message, then the response message is sent onto the control area network 12 as shown at block 122. As shown at block 124, the master controller 40 on that network receives the message via one or more control ports 54, and then processes the message. A channel associated with the operation on the device 16a-16n is turned ON by the device control FW 44, as shown at block 126. A message incorporating the channel number and the sender of the message is then sent via device control firmware 44 to FW event module 80 within the Java virtual machine 60, as shown at block 128.

As shown at block 130, based on the sender and channel number, an appropriate event handler method is invoked within a NetLinx device class 68 of the DUET object 66. The event handler method invokes one or more DUET feedback API 76 standard API methods that correspond to one or more operations in the SNAPI router 62, as shown at block 132. An appropriate method within the SNAPI NetLinx device class 64 is then invoked by the DUET API 78, as shown at block 134. As shown at block 136, the SNAPI NetLinx device class 64 method then determines the appropriate recipient based on the channel number and forms a message including the appropriate recipient and a channel number uniquely identifying a SNAPI router notification 82. The message is sent via device control firmware 44 to the NetLinx program 48a and executed by a NetLinx interpreter 42, as shown at block 138.

As shown at block 140, the NetLinx program 48a determines the appropriate action based on the channel number. Based on that action, NetLinx program 48a forms a message including the appropriate recipient and a channel number uniquely identifying a component on user interface 14. The message is sent via device control firmware 44 to user interface device 14, as shown at block 144. A channel associated with the origin of the data (e.g., a particular button pressed on user interface device 14) is updated by the device control FW, as shown at block 142. The ON state of the channel of the origin of the data (e.g., a particular button pressed on user interface device 14) is conveyed to the user interface device 14, such that the user interface device 14 may provide feedback to the user. For instance, highlighting a particular button, as shown at block 146.

For example, referring to FIGS. 1, 2 and 5, as shown at block 92, a user may have selected a "play" button on a touch panel of a user interface device 14 that corresponds to a particular VCR 16a. Assuming that the "play" button is identified as channel "40" and the user interface device 14 is identified as sender "128:1:1," a message will be formed containing at least the sender, channel pair (e.g., the message contains "128:1:1" and "40"). The user interface device 14 may send the message to the master controller 40 via a serial control port 54 on the master controller 40. A channel state (e.g., "40") associated with the "play" button on user interface device 14 is turned ON by the master controller to indicate that the channel is on, as shown at block 100. A message incorporating the channel number, the sender of the message, and the recipient of the message is then sent to a NetLinx program 48a executed by a NetLinx interpreter 42, as shown at block 102.

As shown at block 104, the NetLinx program 48a determines the particular VCR device 16a based on the channel number of the "play" button of the user interface 14 and forms a message including the VCR 16a and a channel number uniquely identifying an operation on the VCR 16a. Assuming that the "play" operation on the VCR is identified as channel "60" and the SNAPI NetLinx device class 64 representing VCR 16a is identified as recipient "4000:1:1," a message will be formed containing at least the recipient, channel pair (e.g., the message contains "4000:1:1" and "60").

The message is sent via device control firmware 44 to FW event module 80 within the Java virtual machine 60, as shown at block 106. As shown at block 108, based on the recipient and channel number, a channel event handler method is invoked within a NetLinx device class 64 of the SNAPI object 62. The event handler method invokes the play ( ) method of the DUET API 78 standard API that correspond to the play operation on the VCR 16a, as shown at block 110. The sendString ( ) method within the DUET NetLinx device class 68 is then invoked by the DUET API 78, as shown at block 112. The DUET NetLinx device class 68 method then communicates the requested operation to the VCR 16a using the VCR's proprietary protocol, as shown at block 114. As shown at block 116, the play operation is thereby performed on the VCR 16a.

Figure 6:
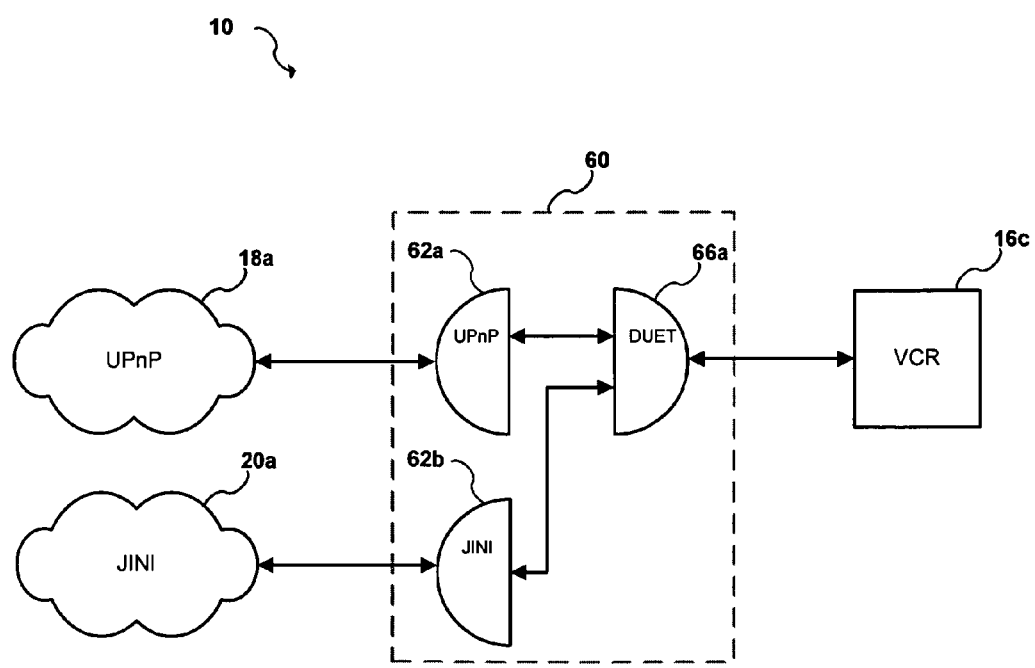
FIG. 6 is a block diagram illustrating a control system configuration interconnecting two disparate protocols according to an embodiment of the present invention.

Referring to FIG. 6, a block diagram illustrating a control system configuration interconnecting two disparate protocols according to an embodiment of the present invention is shown. In this configuration, one or more devices in a UPnP network 18a communicate with a UPnP router 62a having similar functionality as the SNAPI object 62 previously described. Further, one or more devices in a JINI network 20a communicate with a JINI router 62b also having similar functionality as the SNAPI object 62 previously described. Devices on the UPnP network 18a are interconnected to devices on the JINI network 20a via DUET object 66. Additionally, devices 16a-16n, such as VCR 16c, on a control area network 12 may communicate with one or more devices on either the UPnP network 18a or the JINI network 20a.

III. Dynamic Device Discovery

According to the present invention, one or more devices 16a-16n, user interface devices 14, and/or master controllers 40 may be configured to handle dynamic device discovery within control system 10. The present invention provides for one or more devices 16a-16n to be dynamically added, updated or removed within control system 10, prior to or during its operation. As an example, a developer using the present invention may write or utilize generic code to control any brand of VCR. Although the underlying control mechanisms for the different types and brands of VCRs may be fundamentally different, the functionality (e.g., play, stop, pause) is generally common between VCRs. Thus, the actual underlying control mechanisms for the physical device may be abstracted functionally through the use of the generic code. According to one embodiment of the present invention, a physical device is associated with an application device. The underlying application device is dynamically associated upon the detection of a new physical device based on the characteristics of that device. This association may be accomplished without underlying changes to the generic code. The generic code is also referred to as the "glue code." In another embodiment, application device is dynamically associated a virtual device 16a-16n which represents one or more physical devices 16a-16n.

Figure 7:
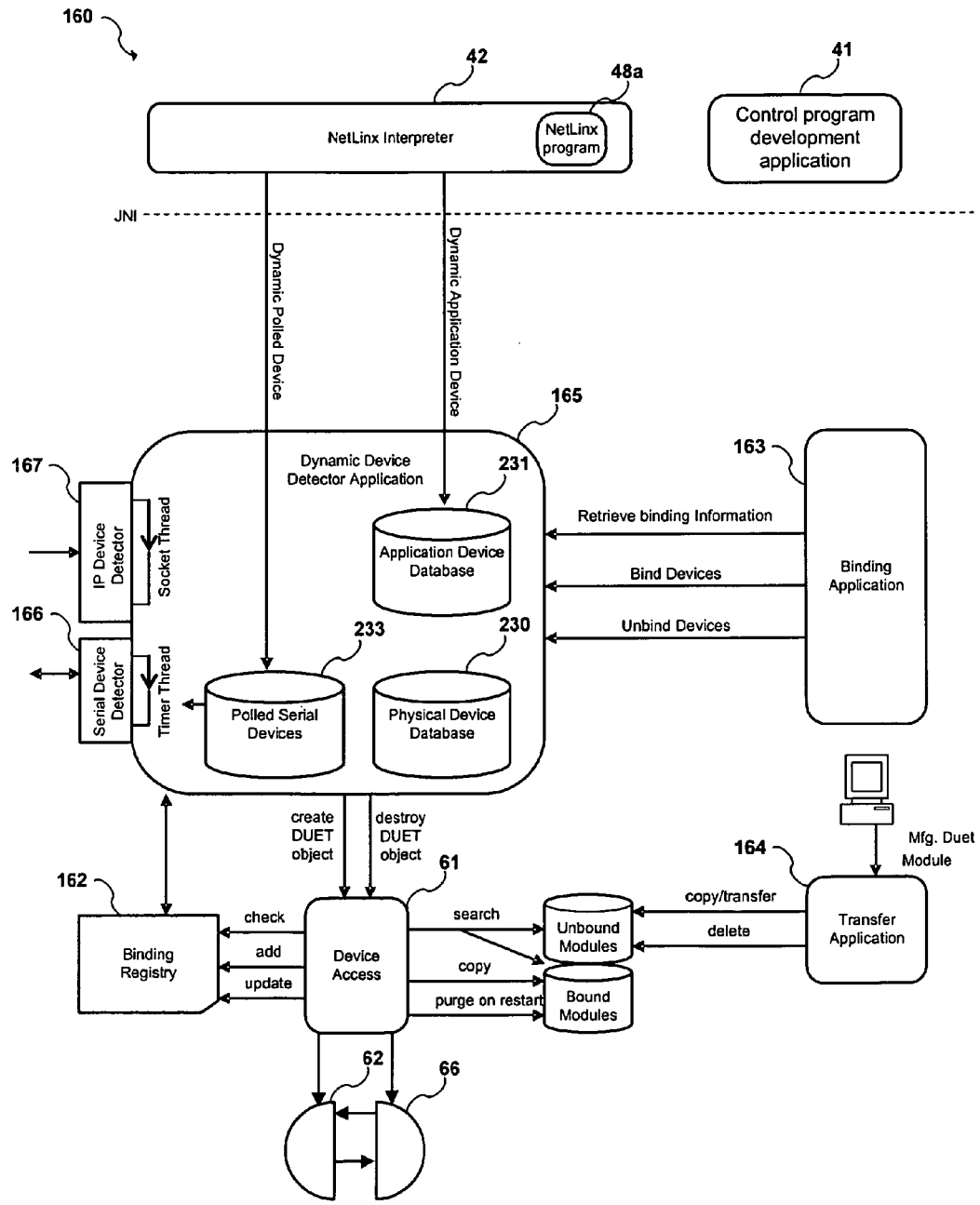
FIG. 7 is a block diagram illustrating the components of a dynamic device detection application according to an embodiment of the present invention.

Referring to FIGS. 2 and 7, a control program development application 41 provides user interfaces for the development of a control program. In one embodiment, the control program is a NetLinx program. Within the NetLinx program, the user defines invocations to the Load_Duet_Module ( ) method. The method parameters include an application device identifier, a physical device identifier and a list of properties (name/value pairs). The control program utilizes an application device to direct all control requests for a device 16a-16n. The physical device identifier is used by DUET Object 66 to create NetLinx device class 68 objects to communicate with device 16a-16n. The list of properties (name/value pairs) describe the module to be loaded. These properties include, but are not limited to, Device-Make, Device-Model, Device-SDKClass and Device-Revision. The control program development application 41 may transfer NetLinx program 48a to master controller 40. The control program development application 41 may also transfer any corresponding DUET and SNAPI modules to one or more Java libraries 50 and 52. In one embodiment, such transfers are stored on a flash disk of master controller 40.

During run-time execution of master controller 40, NetLinx interpreter 42 invokes one or more Load_Duet_Module ( ) methods within NetLinx program 48a using Java native interface (JNI) within device access 61. Device Access 61 searches one or more Java libraries 50 and 52 for an OSGi bundle which best matches the properties supplied as a parameter to the Load_Duet_Module ( ) method. If a match is found, device access 61 instantiates the corresponding DUET object 66 and SNAPI object 62 using the matching OSGi bundle. The DUET object 66 then creates NetLinx device class 68 object based on the physical device identifier supplied as a parameter to the Load_Duet_Module ( ) method. The NetLinx device class 68 object communicates via communication paths 86 and 88, as shown in FIGS. 3 and 4, with physical device 16a-16n using an appropriate protocol for that device. The SNAPI object 62 creates one or more NetLinx device class 64 objects based on the virtual device identifier supplied as a parameter to the Load_Duet_Module ( ) method. NetLinx device class 64 object communicates via communication paths 82 and 84, as shown in FIGS. 3 and 4, with the NetLinx Interpreter 42 running NetLinx program 48a.

Referring to FIG. 7, a block diagram illustrating the components of a dynamic device detection application according to an embodiment of the present invention is shown. As previously mentioned, control program development application 41 provides user interfaces for the development of a control program. In one embodiment, within a NetLinx program, the user defines invocations to the Dynamic_Polled_Port ( ) method to specify one or more serial ports to be polled for dynamic serial devices 16a-16n. The user may also define invocations to the Dynamic_Application_Device ( ) method to specify any device interfaces to be used within the control application for each application interface. For serial devices in which the user knows what serial port on master controller 40 the serial device 16a-16n will be connected to, the user can define an invocation to the Static_Port_Binding ( ) method to specify binding an application device to the physical device via the specified serial port. The control program development application 41 may transfer NetLinx program 48a to master controller 40. In one embodiment, NetLinx program 48a is stored on a flash disk of master controller 40.

During run-time execution of master controller 40, NetLinx interpreter 42 invokes one or more Dynamic_Polled_Port ( ) methods within NetLinx program 48a using JNI within dynamic device detection application 165. This results in the serial port being added to polled serial devices database 233. NetLinx Interpreter 42 invokes one or more Dynamic_Application_Device ( ) methods within NetLinx program 48a using JNI within device access 61. This results in the creation of one or more dynamic application device objects which are then added to application device database 231. The dynamic application device objects may include the parameter information provided as a parameter to the Dynamic_Application_Device ( ) method. NetLinx Interpreter 42 invokes one or more Static_Port_Binding ( ) methods within NetLinx program 48a using JNI within device access 61. This results in the creation of a dynamic application device object which is added to application device database 231. A corresponding shell dynamic physical device is also added to device database 230. The shell dynamic physical device includes the physical device identifier provided as a parameter to the Static_Port_Binding ( ) method and acts as a placeholder for the binding.

Serial device detector 166 may be configured to periodically loop through polled serial device database 161, transmit a poll request to the polled serial devices and to listen for poll responses. IP device detector 167 may similarly be configured to listen for IP devices discovered on IP sockets. In one embodiment, this is accomplished using a Multicast UDP address.

Binding Application 163 provides user interfaces for managing bindings between dynamic application devices and physical devices 16a-16n. Binding application 163 may be configured to request that dynamic device detection application 165 retrieve information from application device database 231 and device database 230.

Binding registry 162 is a persistent disk storage of the current binding information. In one embodiment, the binding registry 162 contains which dynamic application devices that are bound to dynamic physical devices. Thereby, upon the reboot of master controller 40, the binding settings provided by the user through the binding application 163 will not be lost.

Transfer application 164 provides an interface for users to upload DUET modules onto master controller 40, delete modules from master controller 40 and to retrieve existing modules from master controller. An unbound portion of the Java Libraries may be used to prevent conflicts with any running/bound DUET modules and their associated DUET objects 66.

When a physical device is discovered by the dynamic device detection application 165, its beacon information along with the physical device discovery location (e.g., the IP address or the serial port) are used to add the dynamic physical device to device database 230. Based on the current binding settings, dynamic device detection application 165 determines whether a DUET Object 66 should be instantiated.

When dynamic device detection application 165 determines that a DUET object 66 should be instantiated, either by user interaction from binding application 163 or by discovery of a new dynamic physical device having a pre-existing binding provided by binding registry 162, the information contained within the bound dynamic application device and dynamic physical device are used to invoke methods within the device access object 61 to create a DUET Object 66 and its associated SNAPI object 62. If a pre-existing DUET module was destroyed, then a method is invoked within device access 61 to destroy the existing the DUET object 66 and its associated SNAPI object 62.

Upon the request to create a DUET Object 66 from dynamic device detection application 165, device access 61 searches one or more Java libraries 50 and 52 for an appropriate DUET module which best matches the properties originating from the dynamic application device and dynamic physical device objects. If a matching DUET module is found, device access 61 instantiates a corresponding DUET object 66 based on the DUET module. Device Access 61 may omit the search step if the user has specified a specific DUET module to be used via the binding application. In this case, the search process is ignored and device access 61 instantiates a DUET object 66 based on the specified DUET module.

Figure 8A:
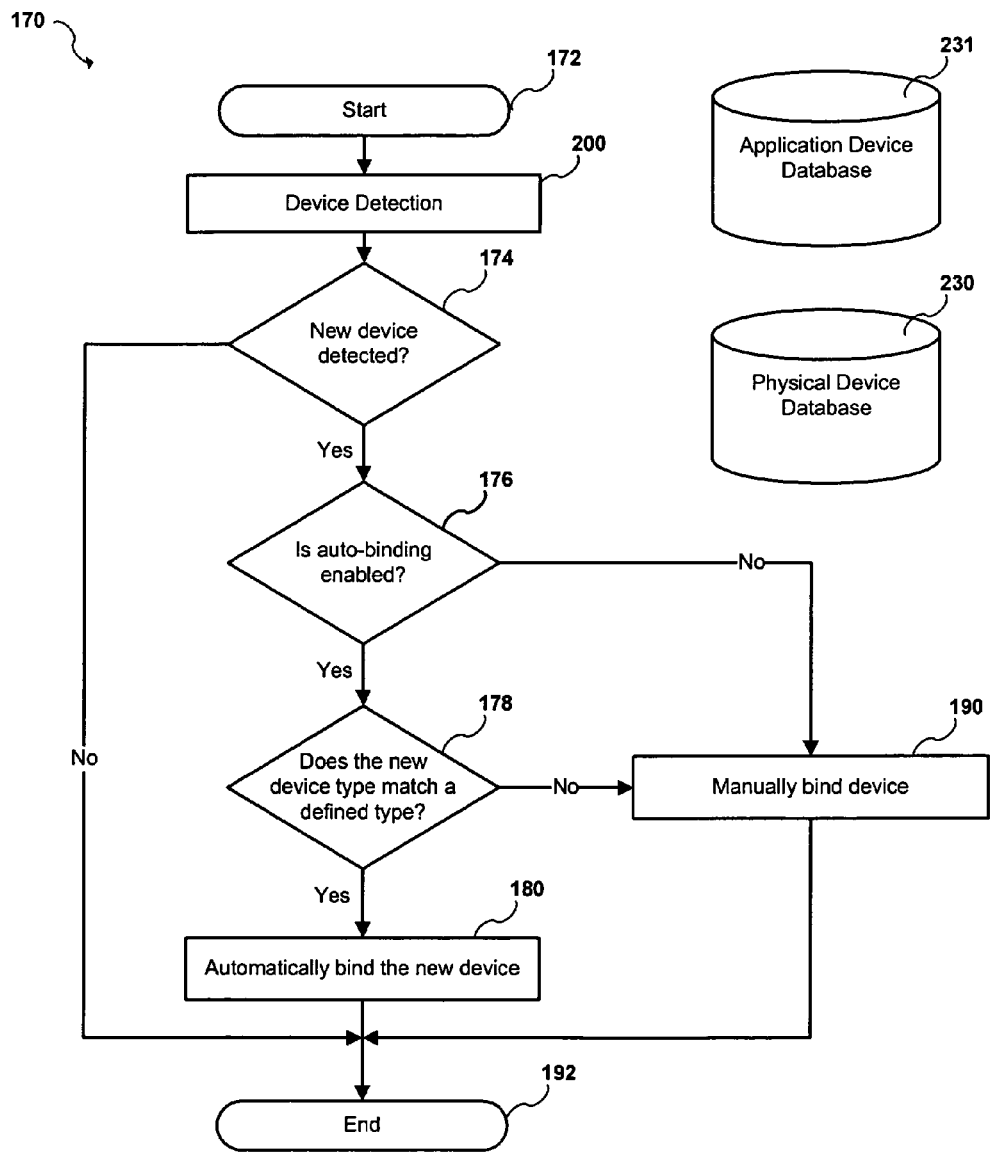
FIG. 8A is a flow chart generally illustrating dynamic device processing according to an embodiment of the present invention.

Referring to FIG. 8A, a flow chart illustrating dynamic device processing according to one possible embodiment of the present invention is shown. As shown at block 200, dynamic device detection occurs within control system 10. Device detection is discussed in detail with respect to FIGS. 8B and 8C below. As generally shown at blocks 174-190, upon detection of a new device 16a-16n within control system 10, an application device is associated with device 16a-16n.

The information contained in an application device is used to instantiate a SNAPI object 62. All control requests are then made to the SNAPI object 62, rather than the physical device 16a-16n. A DUET module is used to instantiate a DUET object 66 which provides services to translate between a set of device specific API calls and the proprietary protocol of the device 16a-16n, thereby hiding the proprietary protocol from the user.

DUET object 66 represents the detected device 16a-16n. Optionally, the application device and DUET module may be used to instantiate SNAPI object 62 and DUET object 66 after the application device is associated. Associating an application device with a physical device is also known as "binding." As shown at blocks 190 and 180, the newly detected device 16a-16n may either be manually or automatically bound.

SNAPI objects 62 are used as control interfaces for devices 16a-16n. Control requests for devices 16a-16n are processed by its corresponding SNAPI objects 62. Thereby, a device 16a-16n (e.g., the "physical device") is abstracted by its corresponding SNAPI objects 62. Any technique may be used to dynamically associate application device with new devices 16a-16n. According to the present invention, binding may include, but is not limited to, static binding and run-time binding. Static binding is known as program defined binding and dynamic binding is known as run-time defined binding. The control program may be any program capable of controlling the new device 16a-16n in a dynamic device environment. According to the present invention, the control program for a new device 16a-16n may include, but is not limited to, a DUET module.

Under static binding, the port (e.g., a serial or IR port) to be used for device 16a-16n is predefined. The device 16a-16n actually to be connected to that port is not required to be specified. Instead, the device 16a-16n on that port is dynamically detected at run-time and then bound to the appropriate application device. Static binding may be used to hardcode the port to be used for a device without having to specify the actual manufacturer or brand of the device.

Under dynamic binding, an application device and its associated classes are predefined. The port that the device 16a-16n is bound to is not required to be specified. Instead, new devices 16a-16n are bound to the appropriate application devices at run-time. Devices 16a-16n may be bound either manually or automatically as they are detected on the control system 10. Any user interface may be used to manually bind an application device with a new device 16a-16n. In one embodiment, binding is manually specified using a web browser in communication with a web server application hosted on master controller 10, as generally shown in FIGS. 9-14. Manual binding may be used in addition to automated binding. For instance, manual binding may be used to modify a device 16a-16n that was automatically bound upon detection. Additionally, some devices 16a-16n may be automatically bound while other devices 16a-16n may be manually bound. For certain devices 16a-16n, dynamic binding may be preferable over manual binding. For instance, dynamic binding is the preferred binding option for IP devices 16a-16n due to the dynamic nature of their IP addresses.

Numerous methods of detection may be used to detect devices 16a-16n that are added to control system 10. According to the present invention, the methods of detection include, but are not limited to, dynamic device discovery protocol (DDDP) and user defined methods. A user defined method may be defined by a user using any means including the use of a user interface. Any user interface may be used to manually define a method of detection. In one embodiment, a method of detection is manually specified using a web browser in communication with a web server application (e.g., a Java servlet) hosted on master controller 10, as generally shown in FIGS. 9-14. According to the present invention, new device detection may use, but is not limited to, an external discovery protocol manager (e.g., UPNP), a multicast reception of a dynamic device beacon, or receipt of a beacon response on an application specified list of serial devices.

Any communication protocol or interface may be used within the scope of the present invention for device detection. In one embodiment, dynamic physical devices are detected over serial interfaces and IP interfaces using DDDP. Dynamic device detection over IP interfaces may be configured to utilize the network's higher layers of multicast to broadcast the existence of a new device 16a-16n. Serial devices may be configured to utilize DDDP or any other protocol, such as fixed protocol that may be incompatible with DDDP. Dynamic device detection over serial interfaces may utilize periodic polling of devices. In response to a poll request, devices 16a-16n may be configured to broadcast their existence upon their addition to control system 10. According to the present invention, the interfaces or ports (e.g., a NetLinx interface or a serial port) to be polled may be predefined or variable.

An application device may be associated with a particular device type using various techniques. In one possible embodiment, each device type corresponds to a Java interface within a DUET device software development kit (SDK). A user specifies the device type of a particular application device by providing a particular SDK class name.

According to the present invention, dynamic IP device detection may utilize sockets for communication between devices 16a-16n and master controllers 40. In one possible embodiment, a multicast UDP socket having a predefined multicast group and port (e.g., port 9131) is utilized. A listener is used to listen for dynamic device beacons that are sent by devices 16a-16n and dynamic device bindings that are sent by master controller 40 to notify other masters controllers 40 in a control area network 12 of the ownership of a dynamic device that has previously entered the system. Upon the dynamic binding of device 16a-16n to an application device, a dynamic device binding is transmitted on the multicast group to notify all other master controllers 40 in control system 10 that the device 16a-16n has been bound. Conversely, when device 16a-16n is unbound, a notification is transmitted on the multicast group to notify all other master controllers 40 in control system that the device 16a-16n has been unbound.

Figure 8B:
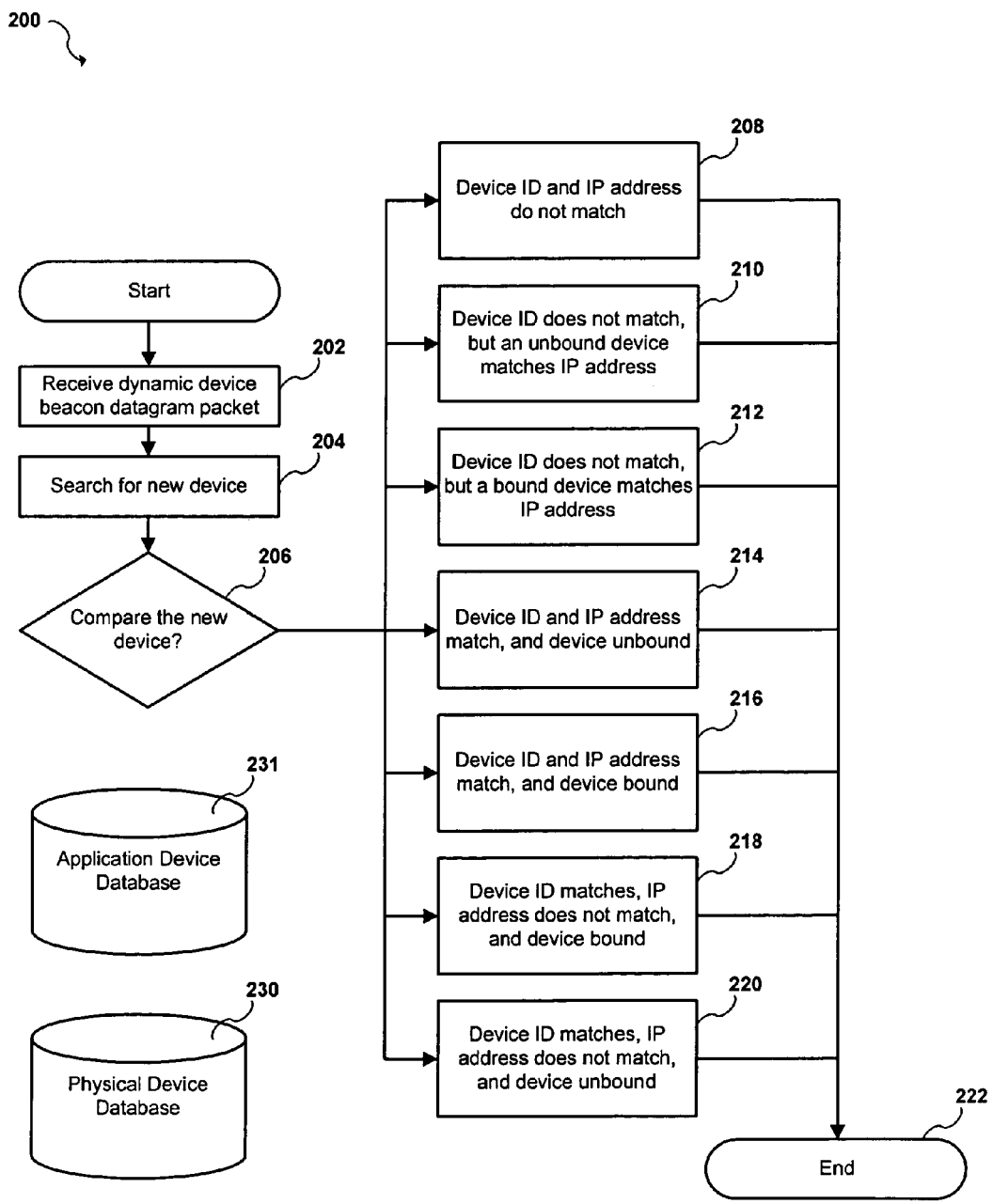
FIG. 8B is a flow chart illustrating dynamic IP device processing according to an embodiment of the present invention.

Referring to FIG. 8B, a flow chart illustrating dynamic IP device processing according to one possible embodiment of the present invention is shown. As shown at block 202, a dynamic device beacon datagram packet is received. According to the present invention, devices 16a-16n are configured to transmit one or more device beacon messages. Transmission of device beacon message may be configured to occur, without limitation, (i) when the device initially starts up, such as when the device is initially booted or rebooted; (ii) upon a determination that the device connection has been lost, such as upon the reboot of the master control, the device being unbound, or a network communication failure; (iii) at periodic predefined or variable intervals; or (iv) by any other reasonable means. The device beacon message may include, but is not limited to, (i) information that is useful to connect the device, such as the dynamic or static IP address, and the port; (ii) a universal unique identifier for the device (UUID); and/or (iii) information specific to the type of device. The device UUID is a unique identifier to distinguish one device from every other device. In one embodiment, the UUID for IP devices is the MAC ID, and the UUID for serial devices is uniquely assigned by the manufacturer of the device. If a UUID is not supplied by the manufacturer of a serial device, then the physical NetLinx device address of the associated serial port to which the device is connected may be used as the UUID (e.g., 5001:1:0). Information specific to the type of device includes, but is not limited to, the SDK interface class name, the DUET module match criteria, and/or the make, model and revision number of the device 16a-16n.

As shown at block 204, a search is performed for the new device within device database 230. The new device is compared against the existing entries in device database 230, at block 206. As shown at block 208, the new device identifier and the IP address of the new device may not exist in device database 230. For instance, when a new device is added to a control area network 12 for the first time an entry will not exist in device database 230. If this occurs, the device is added to device database 230 as an unbound device.

As shown at blocks 210 and 212, the new device identifier may not exist in device database 230, but another device may already exist with the new device's IP address. For instance, restarting the DHCP server may result in a previously assigned IP address being reassigned to another device. Use of static IP addresses may similarly result in an IP address conflict. If this occurs, the device entry is removed and the new device is added to device database 230. Additionally, if the conflicting device was bound, the DUET objects 66 and SNAPI objects 62 corresponding to the conflicting device are destroyed.

As shown at blocks 214 and 216, the new device identifier and the IP address of the new device may exist in device database 230. If the device information in device database 230 does not match, then the device information is updated in device database 230. For instance, an update to the firmware of the new device may result in its device information having a new revision number. In this situation, the new device information is updated in device database 230, and DUET object 66 and SNAPI object 62 are instantiated.

As shown in block 216, it is possible that the new device is bound, and no DUET objects 66 and SNAPI objects 62 have been created for the new device. In one embodiment, at startup, DUET objects 66 and SNAPI objects 62 are not automatically instantiated for bound IP devices. Instead, it is assumed that a device beacon message will be received from the new device 16a-16n to initiate the creation of DUET objects 66 and SNAPI objects 62 corresponding to the new device. For instance, when a master controller 10 is rebooted, it may take several minutes for the new device to timeout on its socket connection. When a device beacon message is received by the master controller 10, a DUET object 66 and SNAPI object 62 are created for the new device. If the new device is bound and DUET objects 66 and SNAPI objects 62 already exist for the new device 16a-16n, then it is assumed that the DUET object 66 will re-connect to device 16a-16n if it looses a connection.

As shown at blocks 218 and 220, the new device identifier may exist in device database 230, but the new device's IP address does not match the device database entry. For instance, restarting the DHCP server may cause the new device to be reassigned a new IP address. The new IP address is updated in device database 230 if it does not conflict with any other entry.

Embodiments of the present invention may include, but art not limited to, (i) updating existing device database entries based on the device beacon message content to dynamically update the IP address and other device information; (ii) preventing IP address conflicts by destroying old device information when a new device beacon message is received that matches an existing IP address; and (iii) preventing thrashing of DUET module loads and unloads where two or more devices have conflicting IP addresses.

Figure 8C:
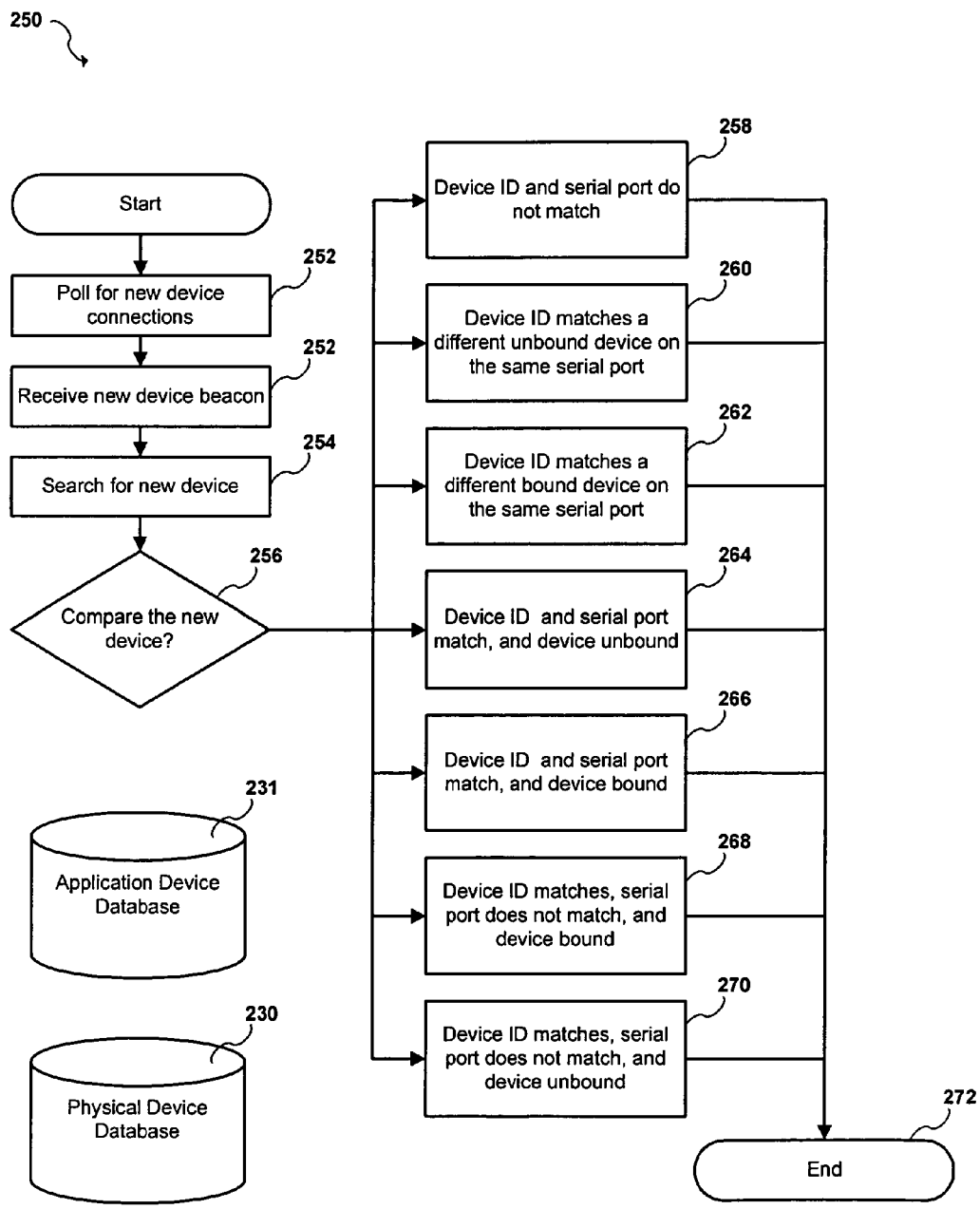
FIG. 8C is a flow chart illustrating dynamic serial device processing according to an embodiment of the present invention.

Referring to FIG. 8C, a flow chart illustrating dynamic serial device processing according to one possible embodiment of the present invention is shown. Serial ports are polled for new serial device connections which upon reply are added to device database 230. The present invention may be configured to poll all serial ports in control area network 12 or a subset thereof. In one embodiment, the serial ports to be polled are defined using a NetLinx language subroutine, DYNAMIC_POLLED_PORT (DEV netlinxDevice). A SerialDevice object is then created for each device that is defined by the NetLinx language subroutine. The default communication settings for each serial port is predefined as 9600 baud, 8 bits, no parity and 1 stop bit. However, other possible communication settings are possible within the scope of the present invention.

As shown at block 252, serial devices are periodically polled for any new devices by transmitting a poll message over the corresponding serial ports. The period between such polling may be predefined. New devices respond by sending a new device beacon message which is received by master controller 10, as shown at block 252. The device beacon message contains device specific information, such as the device ID and other information relating to the device's DUET module (e.g., SDK class and match criteria). As shown at block 256, device database 230 is then searched for the new device. The new device is compared against the existing entries in device database 230, at block 256. As shown at block 258, the new device identifier and the serial port of the new device may not exist in device database 230. For instance, when a new serial device is added to a control area network 12 for the first time an entry will not exist in device database 230. If this occurs, the device is added to device database 230 as an unbound device.

As shown at blocks 260 and 262, the new device identifier may already exist in device database 230 for another device. If this occurs, the device entry is removed and the new device is added to device database 230. Additionally, if the conflicting device was bound, the DUET objects 66 and SNAPI objects 62 associated with the conflicting device are destroyed.

As shown at blocks 264 and 266, the new device identifier and serial port of the new device may exist in device database 230. If the device information in device database 230 does not match, then the device information is updated in device database 230. For instance, an update to the firmware of the new device may result in its device information having a new revision number. In this situation, the new device information is updated in device database 230, and DUET object 66 and SNAPI object 62 are created from an appropriate DUET module.

As shown in block 266, it is possible that the new device is bound, and a corresponding DUET object 66 and SNAPI object 62 have not been instantiated for the new device. If the new device is bound and DUET object 66 and SNAPI object 62 already exist for the new device, then it is assumed that DUET object 66 will re-connect to a device if it looses a connection.

As shown at blocks 268 and 270, the new device identifier may exist in device database 230, but the new device's serial port does not match the device database entry. If this occurs, the new serial port is updated in device database 230.

The present invention provides APIs to access both the runtime application device and device database as well as binding information. These APIs may be used by a binding application. In one embodiment, the binding application is a Java servlet. The APIs include, but are not limited to, retrieving application device information including the current binding state and if a DUET object 66 and SNAPI object 62 are instantiated for the binding; retrieving the list of devices 16a-16n that are not yet bound to application devices (i.e., orphaned devices); binding an application device to a physical device; and unbinding an application device from its physical device.

Figure 9:
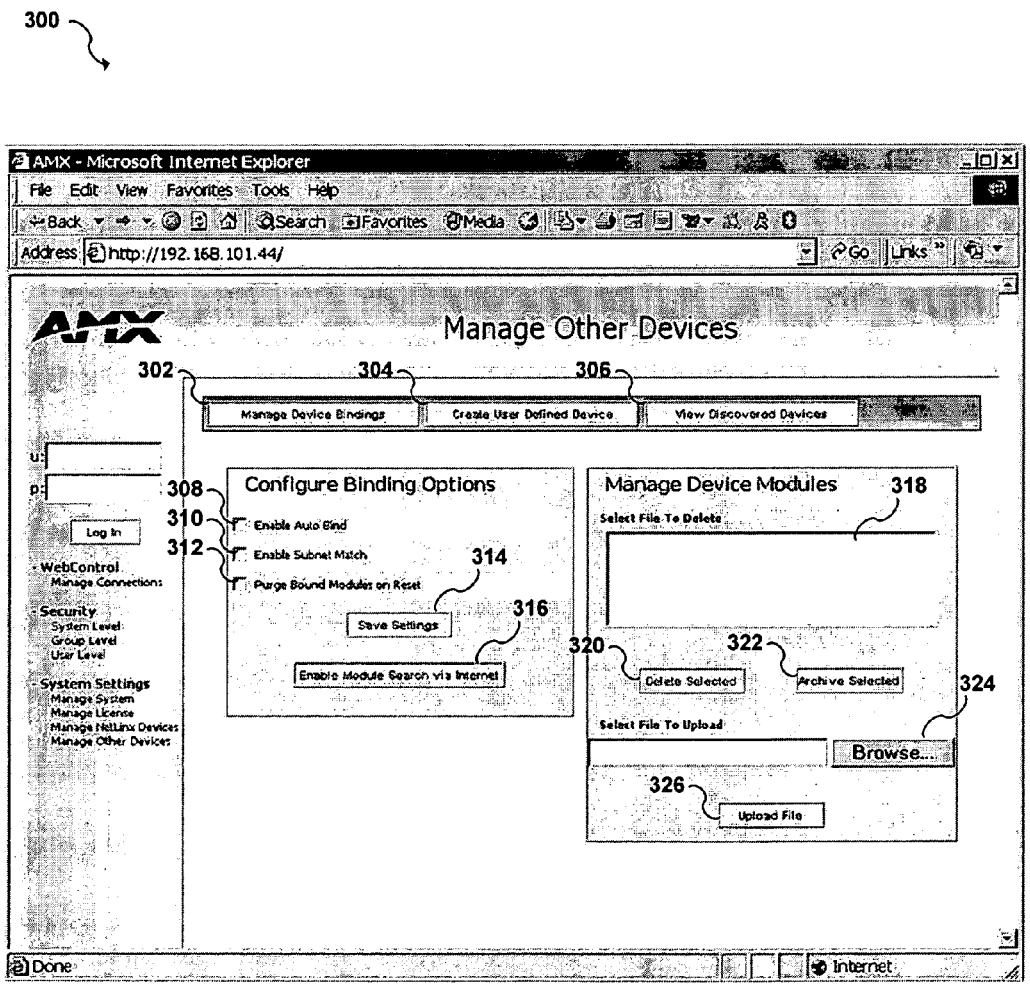
FIGS. 9-14 illustrate an exemplary user interface and computer program for managing dynamic devices according to an embodiment of the present invention.

Referring to FIGS. 9-14, an exemplary user interface and computer program for managing dynamic devices is shown. As shown in FIG. 9, the Manage Other Devices user interface 300 may be used by a user to manually manage devices in control area network 12. The Manage Other Devices user interface 300 is displayed by selecting button 302.

Enable Auto Bind checkbox 308 allows a user to specify whether new devices will be automatically bound. When auto-binding is enabled, master controller 40 will automatically attempt to connect newly discovered physical devices with associated application devices. In one non-limiting embodiment, a newly discovered device and a single entry in application device database 231 is bound where there is a one-to-one correlation therebetween. For example, if the application has only one VCR defined and a VCR is detected in the system, auto-bind will automatically bind the VCR device to the VCR application device. When Enable Auto Bind checkbox 308 is not selected, no auto-bind activity will take place and the binding of newly discovered devices may be manually configured. Enable Subnet Match checkbox 310 allows a user to specify whether IP devices should only be detected or discovered if they are on the same IP subnet as the master controller 40. Purge Bound Modules on Reset checkbox 312 allows a user to specify whether all modules should be deleted from the bound directory upon the next reboot. During the binding process, the associated DUET modules for a device are copied from the unbound directory into a protected bound area. Due to the dynamic nature of Java class loading, it is not safe to delete a running jar file. Purge Bound Modules on Reset checkbox 312 is provided to allow a user with the capability to remove existing modules upon reboot, thereby forcing a re-acquisition of the module at bind time. Optionally, upon reboot, the Purge Bound Modules on Reset checkbox 312 selection will be cleared. The Save Settings button 314 allows a user to save the current selected checkbox values to master controller 40.

Textarea 318 displays the DUET modules currently loaded on master controller 40. The Manage Other Devices user interface 300 may be used to delete, add and retrieve DUET modules. For instance, buttons 326 and 320 may be selected to add and delete DUET modules, respectively.

Figure 10:
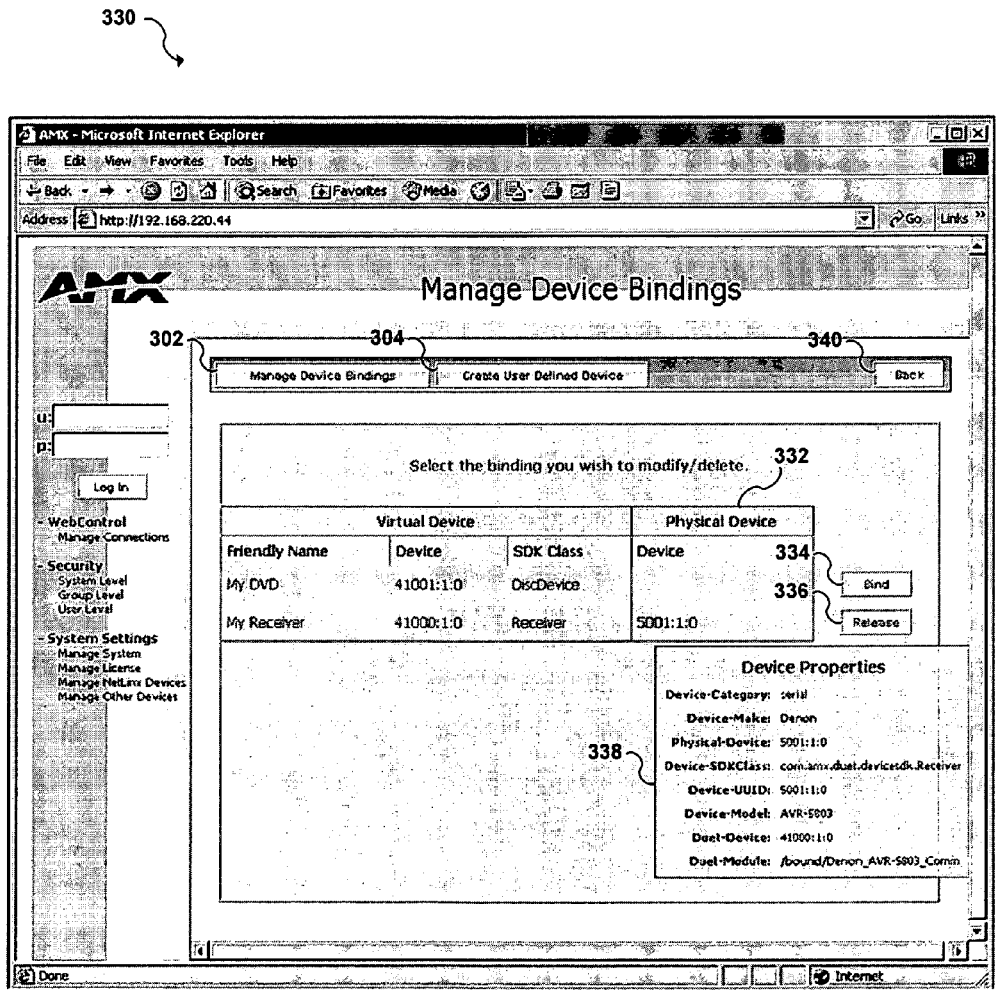

As shown in FIG. 10, the Manage Device Bindings user interface 330 may be used by a user to configure application defined SNAPI objects 62 with discovered devices 16a-16n in control area network 12. The Manage Device Bindings user interface 330 is displayed by selecting button 304. A list of all application defined devices 16a-16n including the defined "Friendly Name," the DUET virtual DPS (device:port:system) and the associated DUET Device SDK class indicating the type of the device.

Application devices include, but are not limited to, static application devices and dynamic application devices. Static application devices specify an application device and its associated Device SDK class type as well as a NetLinx physical device port that the application device is associated with (i.e., statically bound). Dynamic application devices simply specify the application device and its associated Device SDK with no association to a physical port. Binding of an application device to a physical device/port will occur at run-time either via auto-bind or manual binding. Application devices that have a bound physical device will display the physical device ID in the Physical Device column of table 332. If a corresponding DUET object has been instantiated to communicate with the device, property information of device will be displayed in a mouse-over dialog 338 when the cursor hovers over the physical device ID.

The entries in table 332 may have a button associated with it. Static application devices may have an associated Release button 336. Dynamic application devices may have an associated Bind button 334 or Unbind button (not shown). A static application device that has not detected a physical device attached to the predefined port will not have a button associated with its entry. If a physical device has been detected and the SNAPI object 62 and DUET object 66 have been instantiated, then Release button 336 is displayed. Upon selection of Release button 336, the corresponding SNAPI object 62 and DUET object 66 are destroyed and the firmware will return to detecting physical devices attached to the port.

Figure 11:
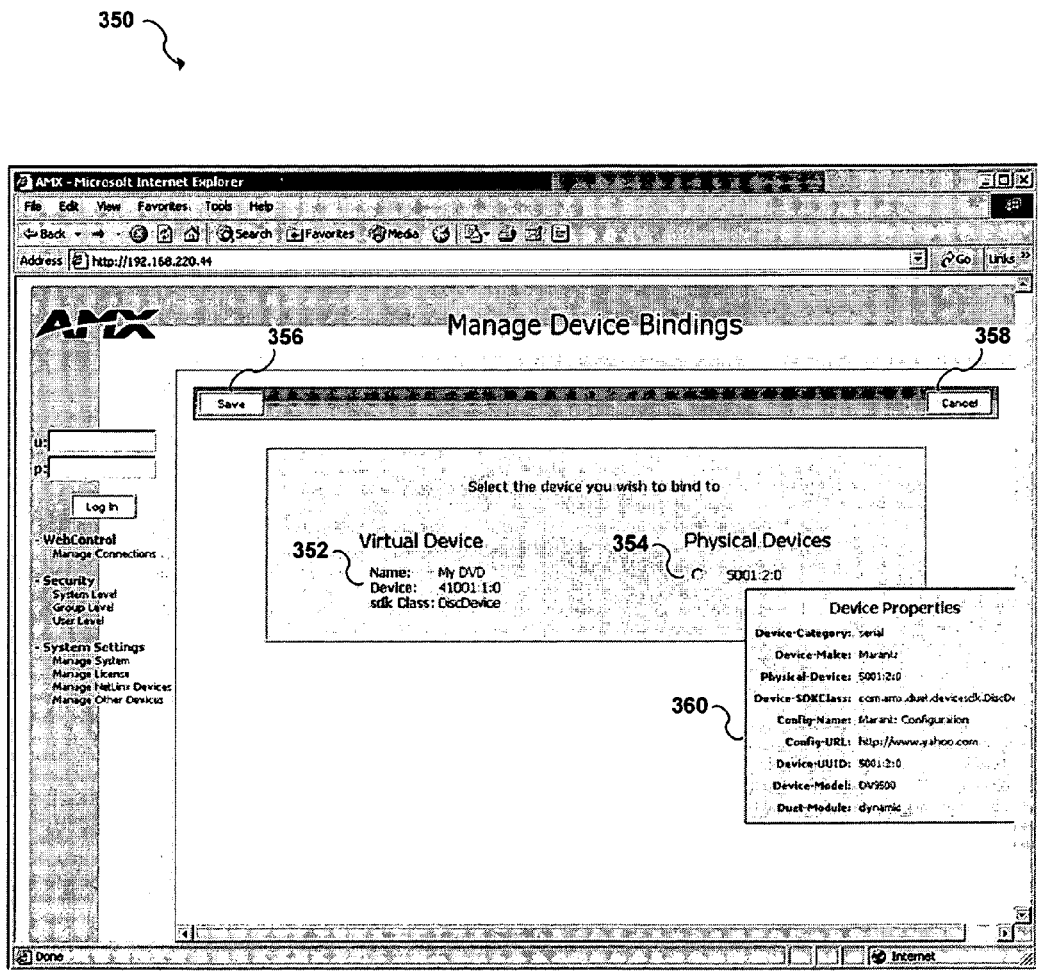

Dynamic application devices that have been bound will display an Unbind button (not shown). Upon selection of the Unbind button, any corresponding SNAPI object 62 and DUET object 66 will be destroyed and the association between the application device and the physical device is removed. Dynamic application devices that have not been bound to a physical device will display Bind button 334. Upon selection of Bind button 334, a second level Manage Device Bindings user interface 350 is displayed, as shown in FIG. 11. The second level Manage Device Bindings user interface 350 displays the available unbound physical devices that match the application device's Device SDK class type.

A user may select one of the available physical devices shown in user interface 350 to bind with an application device. Upon selection of Save button 356, a binding is created and the master controller 40 locates the appropriate DUET module driver. Once a driver is found, the DUET module is used to instantiate DUET object 66, and the physical device is associated with the specified application device. Upon selection of Cancel button 358, the binding activity will be aborted. A mouse-over dialog is provided to display the properties in popup dialog 360 that are associated with a discovered physical device.

Figure 12:
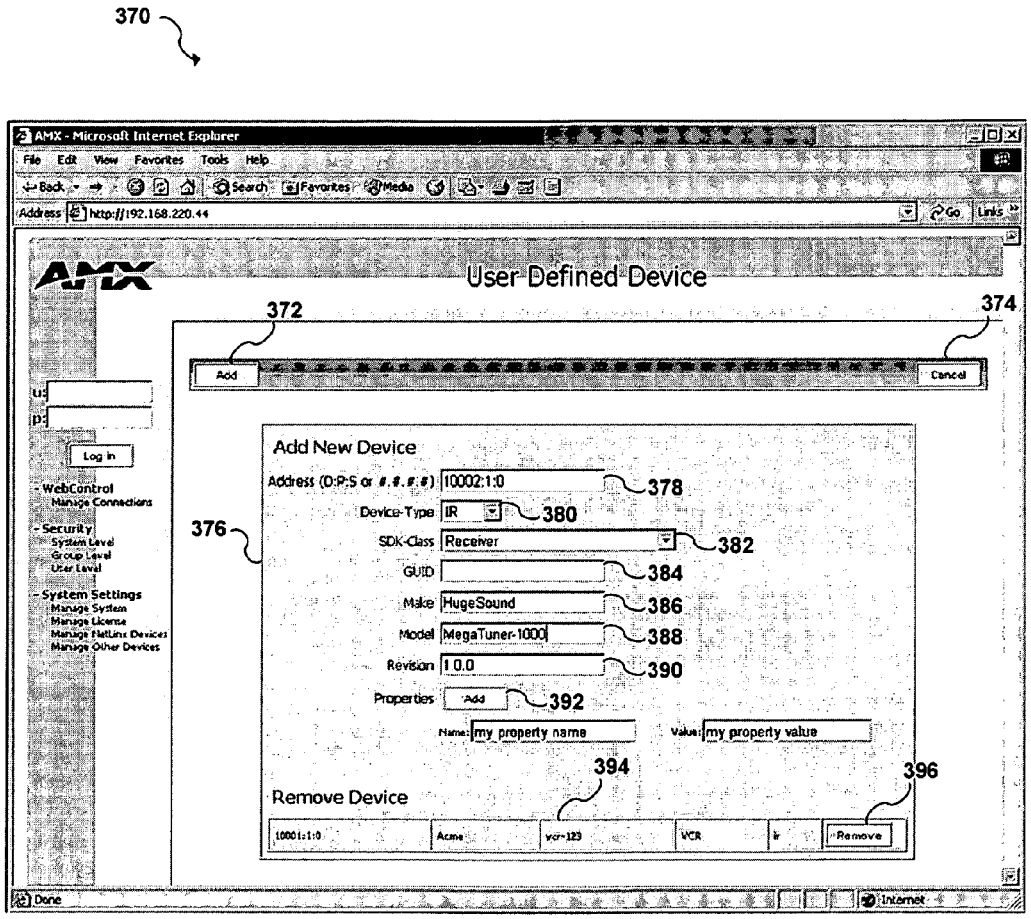

As shown in FIG. 12, the User Defined Device user interface 370 may be used by a user to provide dynamic device support for devices 16a-16n that do not natively support dynamic device processing. The User Defined Device user interface 370 is displayed by selecting button 306. Devices 16a-16n may be added or removed. Devices 16a-16n that have been previously defined are shown in area 394 and may be removed by selecting button 396. Area 376 includes dynamic device properties as defined in the table 1 below.

TABLE 1

| Field | Description |
| --- | --- |
| Address | Address field 378 may be used to specify the address of the NetLinx master port DPS (device:port:system) value or IP address (#.#.#.#) of device 16a-16n. |
| Device-Type | Device-Type drop-down menu field 380 may be used to specify the connectivity type of device (e.g., IR, IP, serial, relay, other). |
| SDK-Class | SDK-Class drop-down menu field 382 may be used to specify the SDK class type of the device. |
| GUID | GUID field 384 may be used to specify a manufacturer specified ID of the manufacturer's device. Either the GUID field or the Make and Model fields must be specified. |
| Make | Make field 386 may be used to specify the manufacturer name. Either the GUID field or the Make and Model fields must be specified. |
| Model | Model field 388 may be used to specify the manufacturer model. Either the GUID field or the Make and Model fields must be specified. |
| Revision | Revision field 390 may be used to specify a device firmware revision. This value automatically defaults to 1.0.0. |
| Properties Add | Properties Add button 392 and fields may be used to input additional name/value pairs of properties to be associated with the device. |

Upon selection of Add button 372, the user defined device is added to physical device database 230 and is displayed in area 394. Upon selection of Cancel button 374, the creation of a user defined device is aborted.

Figure 13:
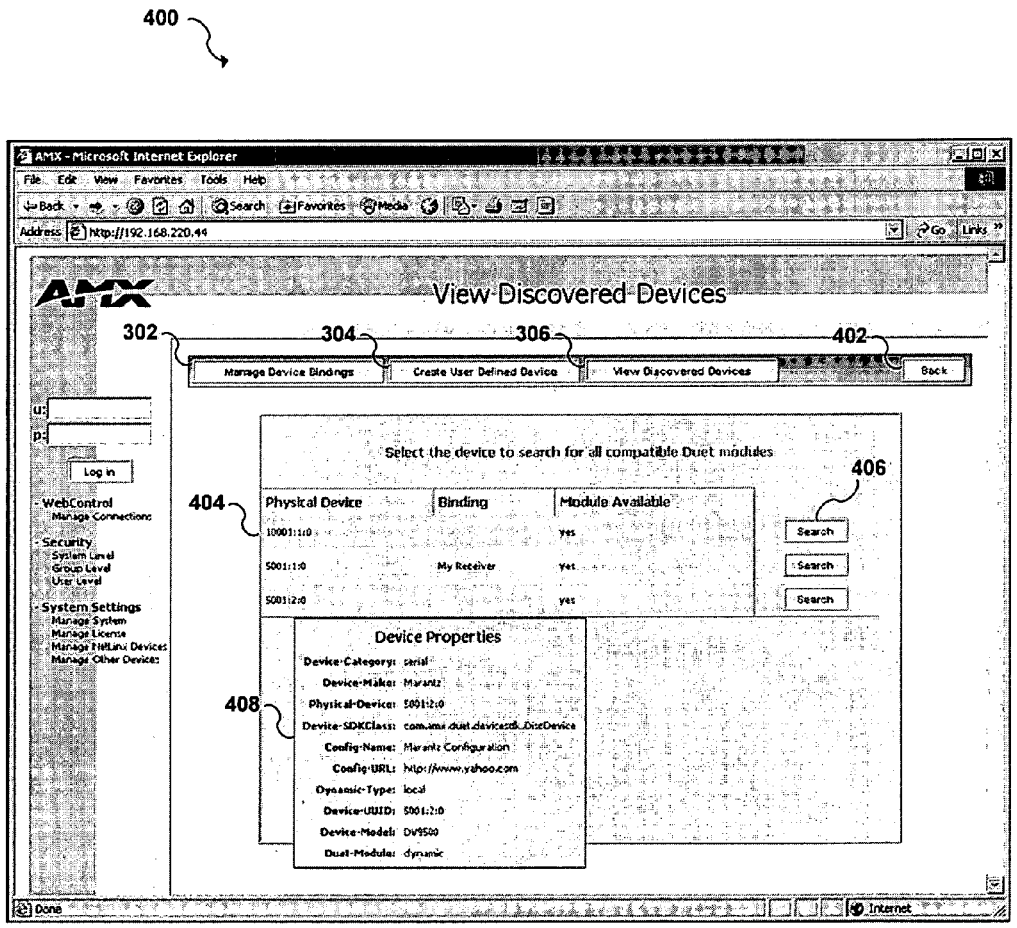

As shown in FIG. 13, the View Discovered Devices user interface 400 may be used by a user to display all of the dynamic devices 16a-16n that have been discovered in the control system 10. The View Discovered Devices user interface 400 is displayed by selecting button 306. A mouse-over display area 408 displays properties associated with a device 16a-16n. If the device is bound to an application device, the associated application device's "friendly name" will be displayed under the Binding column of table 404. The Module Available column of table 404 indicates if a DUET module is available on the system for the physical device.

For each device 16a-16n, Search button 406 is provided to initiate a search for compatible modules. Optionally, if Module Search via Internet button 316 has been previously selected, the search will include querying an online database (e.g., an AMX online database) for a compatible module based on the device's properties. If the device specified a URL in its dynamic device discovery beacon, a file will be retrieved from the URL either over the Internet or from the physical device itself, provided the device has an onboard HTTP or FTP server. If Module Search via Internet button 316 has not previously been selected, then modules will be retrieved from the manufacturer's device. Modules that are retrieved from the Internet or from the manufacturer's device will be placed into an unbound directory and will automatically overwrite any existing module of the same name.

Figure 14:
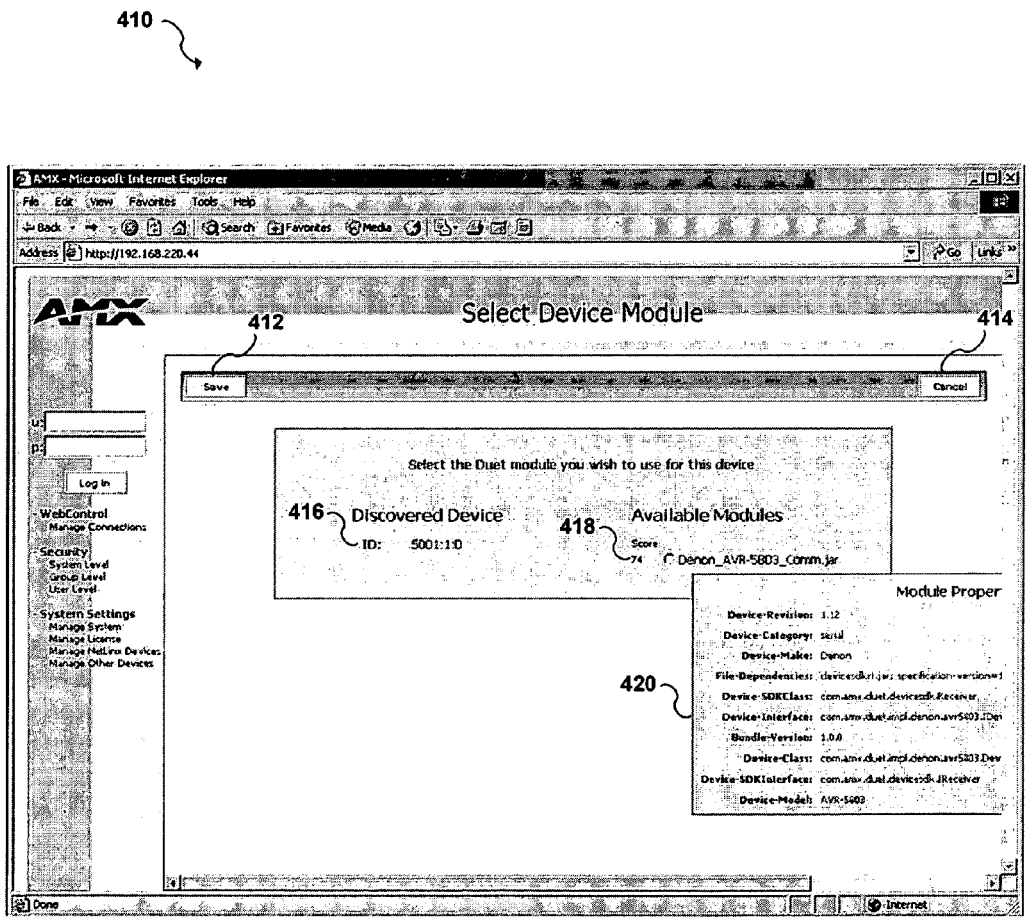

As shown in FIG. 14, the Select Device Module user interface 410 may be used by a user to display each module along with a calculated match value. The Manage Device Bindings user interface 330 is displayed by selecting Search button 406 after a list of all compatible modules is compiled. The higher the match value, the better the match between the DUET module's properties and the physical device's properties. A mouse-over display area 420 for each module lists the properties associated with the module. A user may select the DUET module to be associated with device 16a-16n from the list of compatible modules displayed in area 418. Upon selection of Save button 412, the selected DUET module is associated with device 16a-16n. In one embodiment, the association does not affect any currently running DUET module associated with device 16a-16n, but, instead, will become effective after the next system reboot. Upon selection of Cancel button 414, the association of a DUET module with device 16a-16n is aborted.

Referring to FIGS. 9-14, the exemplary user interface and computer program for managing dynamic devices as shown manages the application devices in the system along with their binding state. This includes the current application defined application devices as well as any pre-existing application devices that were bound but no longer exist in the application's list. The user interface may be used to bind application devices to unbound physical devices. The user interface provides a user with the ability to manage bindings. Management of bindings includes, but is not limited to, initiating a binding and unbinding existing bindings. If an existing binding is unbound and the associated application device is no longer in the list of valid application devices, then the application device will be automatically removed from the system. If an existing binding is deleted, the associated physical device will not automatically be deleted. Unbound physical devices are lost on reboot, as it is expected that they will be re-acquired. The user interface to delete a physical device allows for re-acquisition of an application device for a serial device based on the polling model.

DYNAMIC_APPLICATION_DEVICE( DEV duetVirtualDevice, char[ ] deviceType, char[ ] friendlyName)

The DYNAMIC_APPLICATION_DEVICE NetLinx API causes an application device (41000-42000) to be added to the application device database 231. The duetVirtualDevice values will be displayed to the user on a user interface of the binding application. The deviceType will be used to ensure a valid link between an application device and a physical device. The friendlyName string is used for display purposes by the binding application.

DYNAMIC_POLLED_PORT (DEV netlinxDevice)

The DYNAMIC_POLLED_PORT NetLinx API causes a NetLinx serial device to be added to the polled serial devices 233 that are polled/listened for new dynamic devices.

---
STATIC_PORT_BINDING( DEV duetVirtualDevice,DEV netlinxDevice, char[ ] deviceType, char[ ] friendlyName, integer polled)

---

The STATIC_PORT_BINDING NetLinx API causes a permanent binding to be established between the designated DUET virtual device and the designated NetLinx Device and entries to be added to the application device database 231 and physical device database 230 (shell placeholder). The device-Type field may be used to ensure a valid device type is attached to the physical port on the master. The polled variable specifies if the designated netlinxDevice must be polled for devices (e.g., serial devices) or not (e.g., IR devices). Valid values are DUET_DEV_NOT_POLLED(0) and DUET_DEV_POLLED(1).

As previously mentioned, serial ports are polled for new serial devices to control system 10. According to the present invention, the serial poll request message may be of any form or content. In one embodiment, the serial poll request message is an ASCII string consisting of:

"AMX" <cr>

Serial ports attached to the polled serial ports are configured to respond to a poll request message with a dynamic device beacon message. According to the present invention, the dynamic device beacon message may be of any form or content.

In one embodiment, the dynamic device beacon message is an ASCII string containing information specific to the attached serial physical device. The content of the ASCII string is packed together to minimize the data size to support devices with minimum memory or processing. The ASCII string includes a prefix (e.g., "AMXB") and one or more non-order dependent name-value pairs separated by '<' and '>':

AMXB<name=value><name=value> . . . <cr>

Certain name-value pairs may be required. In one embodiment, Device-UUID and Device-SDKClass name-value pairs are required. The Device-UUID is a unique identifier to distinguish the physical device from every other device. For IP devices this will most likely be the MAC address. For serial devices, it is the responsibility of the manufacturer to create a unique value, for example, a combination of the manufacturer name and serial number. The Device-SDKClass is the class name that the associated DUET module extends. This is a fully qualified class name including package name. For example, a fully qualified VCR class name may be "com.amx.duet.devicesdk.VCR."

Dynamic IP devices are configured to report the IP address and IP port value which will be used for communication between the DUET object 66 the dynamic IP device. A combination of either Device-GUID or Device-Make and Device-Model may also be supplied. These Device-GUID, Device-Make and Device-Model name-value pairs may be used to determine the proper DUET Module driver that should be used to service the physical device. The Device-GUID is a unique identifier designating a specific manufacturers device. For example, the Device-GUID may identify a particular type of Sony VCR. All Sony VCRs of this type would have the same Device-GUID. Similarly, the Device-Make and Device-Model values delineate a particular manufacturer's device.

The dynamic device beacon message may also include, but is not limited to, a Device-Revision and Bundle-Version. Device-Revision specifies a particular firmware version that is running in the physical device. Bundle-Version specifies DUET Module version number required to interface with the physical device.

In one embodiment, the end of the device beacon message ASCII string is designated with a carriage-return ('\r'). For example, dynamic device beacon message may resemble the following without limitation:

---
AMXB<Device-UUID=1F:35:B9:00:41:AD>
<Device-SDKClass=com.amx.duet.devicesdk.VCR>
Device-GUID=SONY137fb79><IP-Address=192.168.13.54>
<IP-Port=2000><cr>
Or
AMXB<Device-UUID=YAMAHAXB1-3468901>
<Device-SDKClass=com.amx.duet.devicesdk.Receiver>
Device-Make=Yamaha><Device-Model=XB1>
<Device-Revision=v1.0.3><cr>

---

The name-value pairs contained within the beacon string ("<xxx=yyy>") may be added to the Java Properties object that is associated with the Java NetLinxDevice object and ultimately the DUET object 66 that controls the device.

A dynamic device binding notify message may be transmitted by any means. In one embodiment, a dynamic device binding notify message is sent via UDP to multicast address 239.255.250.250 on port 9131 by a master controller 40 when an IP physical device is bound and the master controller 40 takes ownership of the device. According to the present invention, the dynamic device binding notify message may be of any form or content. In one embodiment, the dynamic device binding notify message is an ASCII string that is identical to the beacon with the exception of the prefix, which is "AMXL," indicating a device is bound (or locked).

The present invention thus includes a computer program which may be hosted on a storage medium and includes instructions which perform the processes set forth in the present specification. The storage medium can include, but is not limited to, any type of disk including floppy disks, optical disks, CD-ROMs, magneto-optical disks, ROMs, RAMs, EPROMs, EEPROMs, flash memory, magnetic or optical cards, or any type of media suitable for storing electronic instructions.

Obviously, many other modifications and variations of the present invention are possible in light of the above teachings. The specific embodiments discussed herein are merely illustrative, and are not meant to limit the scope of the present invention in any manner. It is therefore to be understood that within the scope of the disclosed concept, the invention may be practiced otherwise than as specifically described.

Alternate Embodiments

In accordance with disclosed embodiments, a discovery protocol mechanism is provided that allows a control system device, such as a server, to dynamically bind to multiple master controllers. The disclosed discovery protocol mechanism includes a dynamic application device (DAD), a dynamic physical device (DPD), and a master controller. The DAD is defined in a controller program as a virtual device. The DPD comprises a physical device transmitting a discovery protocol beacon. A master controller comprises a control system master that has a DAD defined as a certain device type, e.g., a camera. A master controller may be implemented such that various control system devices and controlled devices may be communicatively coupled thereto.

Figure 15:
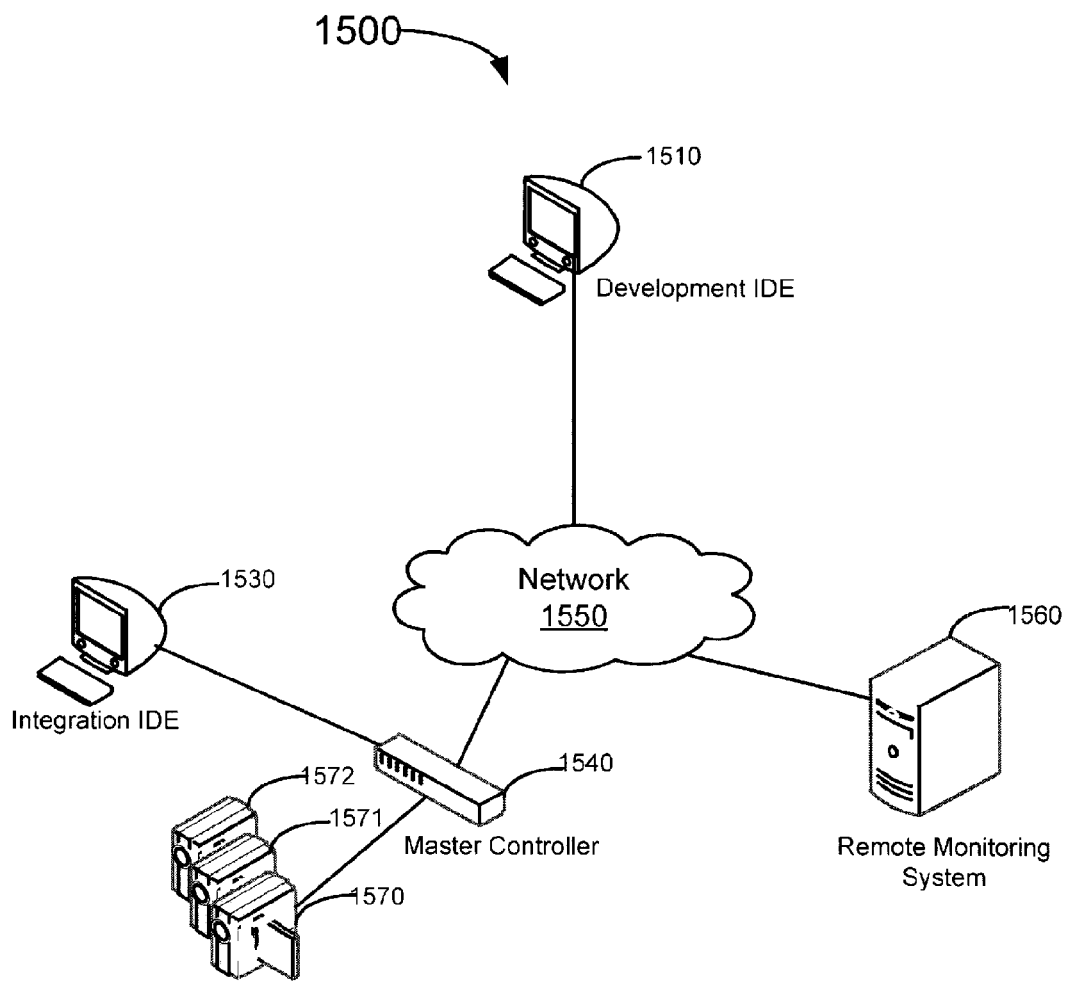
FIG. 15 is a diagrammatic representation of a control system configuration that provides for device control and monitoring and in which a dynamic device discovery routine implemented in accordance with disclosed embodiments may be deployed.

FIG. 15 is a diagrammatic representation of a control system 1500 configuration that provides for device control and monitoring and in which a dynamic device discovery routine implemented in accordance with disclosed embodiments may be deployed. A controlled device development IDE 1510 may be used by device manufactures, e.g., a manufacturer of controlled devices 1570-1572, to develop a Module for the corresponding controlled device. Alternatively, the development IDE 1510 may be used by manufacturers or developers of control system devices. The device Module may be implemented as computer-executable or computer-readable instructions tangibly embodied on a computer-readable medium. A device, such as a camera, tuner, or any other device that may be monitored, controlled, or otherwise manipulated via the control system, that is to be deployed in a control system is referred to herein as a controlled device. A controlled device has a corresponding device Module that facilitates deployment and operation of the controlled device within the control system. An integration IDE 1530 allows device dealers to easily integrate multiple Modules and their associated controlled devices into a single control system 1500. Modules integrated with integration IDE 1530 may be loaded onto a master controller 1540 to enable control of the corresponding devices communicatively coupled with the master controller 1540 in the control system 1500. A remote monitoring system (RMS) server 1560 may feature a resource management suite that provides remote monitoring and control of various controlled devices 1570 integrated in control system 1500. The RMS server 1560 may be communicatively coupled, e.g., via a network 1550, with the master controller 1540 and communicate with RMS agents installed on the master controller 1540. The RMS enables administrators to gather status of controlled devices and to control the devices participating in the control system deployed via the master controller 1540.

Figure 16:
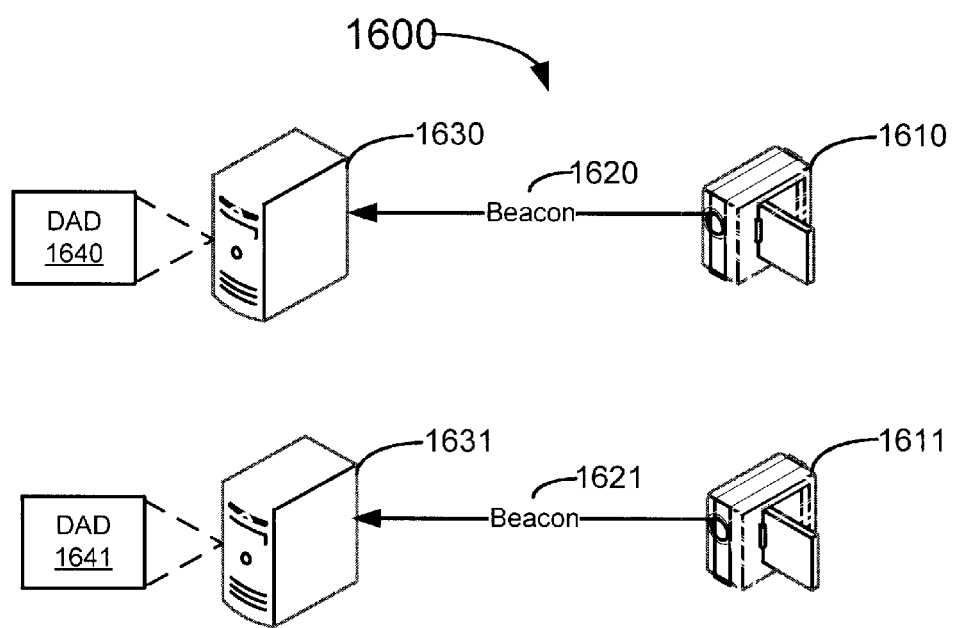
FIG. 16 depicts a diagrammatic representation of a contemporary device discovery and binding mechanism.

Contemporary discovery protocols provide mechanisms for a dynamic physical device to be automatically detected and bound to a master controller 1540. For example, FIG. 16 depicts a diagrammatic representation 1600 of a contemporary discovery and binding mechanism. Dynamic physical devices 1610-1611 may multicast a respective beacon 1620-1621 that facilitates discovery of the DPDs 1610-1611 by a respective master controller 1630-1631. To successfully discover the DPDs 1610-1611 and bind the DPDs to the master controllers, a master controller must have a dynamic application device that matches the device type of the DPD. For example, assuming master controller 1630 is configured with a DAD 1640 that matches the device type of DPD 1610, master controller 1630 will recognize DPD 1610 on receipt of the DPD's beacon 1620. The master controller may then dynamically bind DPD 1610 thereto. In a similar manner, assuming master controller 1631 is configured with a DAD 1641 that matches the device type of DPD 1611, the master controller 1631 will recognize DPD 1611 on receipt of the DPD's beacon 1621, and DPD 1611 is then dynamically bound to the master controller 1631.

Once a DPD is bound to a master controller, the master controller will load the DPD's Module and establish communication with the DPD. The master controller then broadcasts a discovery protocol binding notification message notifying all other master controller that the DPD is no longer unbound. All master controllers receiving the discovery protocol binding notification message must remove the DPD from their unbound DPD List.

Figure 17:
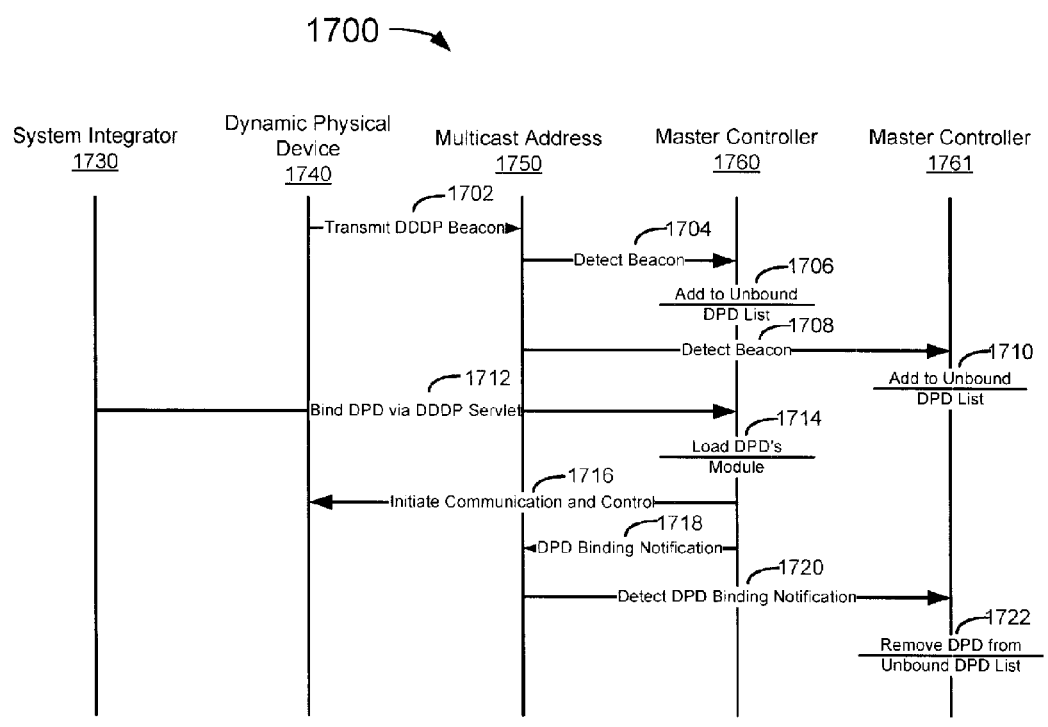
FIG. 17 is a diagrammatic representation of a signaling flow of a contemporary device discovery and static binding routine.

FIG. 17 is a diagrammatic representation of a signaling flow 1700 of a contemporary device discovery and static binding routine. A DPD 1740 broadcasts a dynamic device discovery protocol (DDDP) beacon on a multicast address 1750 (step 1702). Master controllers 1760-1761 may monitor the multicast address for detection of a beacon. For illustrative purposes, assume both master controllers 1760-1761 each have a DAD that matches the device type of DPD 1740. Accordingly, master controller 1760, on detection of the beacon (step 1704), recognizes DPD 1740 and adds DPD 1740 to an unbound DPD list maintained by master controller 1760 (step 1706). Likewise, master controller 1761, on detection of the beacon (step 1708), recognizes DPD 1740 and adds DPD 1740 to an unbound DPD list maintained by master controller 1761 (step 1710).

A system integrator 1730 may access a master controller, e.g., master controller 1760, via a web interface or other suitable communication interface, to explicitly bind DPD 1740 to the correct master controller (step 1712), e.g., master controller 1760 in the illustrative example. The master controller 1760 may then load DPD's 1740 Module (step 1714), and thereafter initiate control and communication of the DPD (step 1716). The master controller 1760 then broadcasts a DPD binding notification on a multicast address (step 1718) which is then detected by the master controller 1761 (step 1720). The master controller 1761 then removes DPD 1740 from the unbound DPD list maintained thereby (step 1722).

The discovery and static binding routine of FIG. 17 requires an administrator to make an explicit, manual choice of which master controller a DPD is bound. Some mechanisms provide an auto-bind option that facilitates a master controller to automatically bind to any DPD which matches a DAD maintained by the master controller. However, contemporary auto-bind mechanisms may cause catastrophic, undefined results when multiple master controllers attempt to bind to the same DPD. Accordingly, static bind mechanisms are preferred in conventional systems when multiple master controllers are listening to the same multicast address for a common DPD device type.

Conventional device discovery mechanisms are suitable for devices that can only bind to one master. However, numerous devices exist, such as control system servers including RMS servers that must bind to multiple master controllers.

Figure 18:
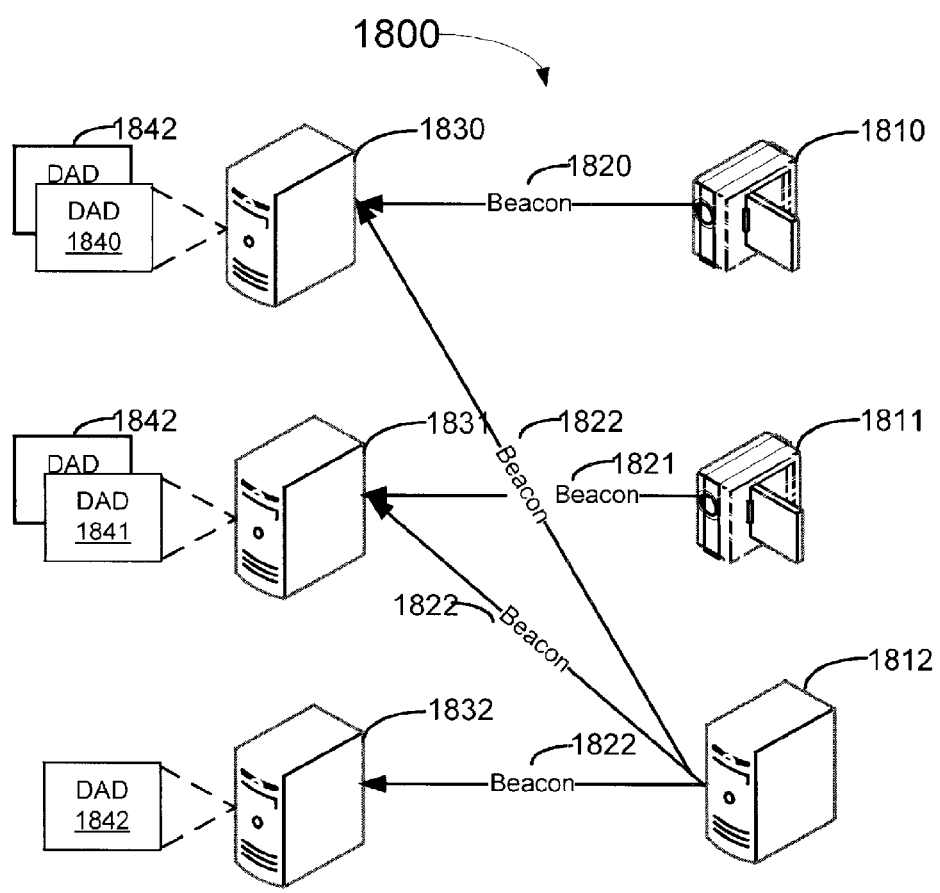
FIG. 18 depicts a diagrammatic representation of a device discovery and binding mechanism implemented in accordance with disclosed embodiments.

FIG. 18 depicts a diagrammatic representation 1800 of a device discovery and binding mechanism implemented in accordance with disclosed embodiments. Dynamic physical devices 1810-1812 may multicast a respective beacon 1820-1822 that facilitates discovery of the DPDs 1810-1812 by a master controller 1830-1832. To successfully discover the DPDs 1810-1812 and bind the DPDs to the master controllers, a master controller must have a dynamic application device that matches the device type of the DPD. For example, assuming master controller 1830 has a DAD 1840 that matches the device type of DPD 1810, master controller 1830 will recognize DPD 1810 on receipt of the DPD's 1810 beacon 1820. The master controller 1830 may then dynamically bind DPD 1810 thereto. In a similar manner, assuming master controller 1831 has a DAD 1841 that matches the device type of DPD 1811, the master controller 1831 will recognize DPD 1811 on receipt of the DPD's 1811 beacon 1821, and DPD 1811 is then dynamically bound to the master controller 1831.

In accordance with an embodiment, a discovery protocol beacon is extended with an optional DPD device Type flag that indicates if the DPD is a discovery protocol-compatible (DP) server. Thus, on receipt of the beacon, a master controller may evaluate the beacon for the presence of the DPD device Type flag. If the device Type Flag is present in the beacon, the value of the flag indicates if the DPD is a DP server. In the event the DPD is a DP server, the DP server may be advantageously allowed to bind to multiple master controllers. In the event that the device Type Flag is not included in the beacon, the device is assumed to be a DP Device, and binding of the DPD is performed according to the above described mechanisms.

In the illustrative example, assume beacon 1822 transmitted by DPD 1812 is an extended beacon including a device Type Flag. Further assume that DPD 1812 comprises a DP server, such as an RMS server. Accordingly, DPD 1812 may set the beacon's device Type flag to indicate DPD 1812 is a DP server. Further assume that each of master controllers 1830-1832 have a DAD 1842 that matches the device type of DPD 1812. In this instance, DPD 1812 is allowed to bind to each of master controllers 1830-1832 that receive DPD's 1812 beacon 1822.

To facilitate binding a server to multiple master controllers, a master controller does not broadcast a binding notification notifying other master controllers the DPD is no longer unbound in the event a DP server is successfully bound to the mater controller. Thus, multiple master controllers 1830-1832 are allowed to bind to the same DP server 1812.

A master controller's discovery protocol firmware may be extended to allow an alternative auto-bind option for DP devices and DP servers thereby allowing master controllers to auto-bind to DP servers while still requiring a static bind procedure to be performed with DP devices.

Figure 19:
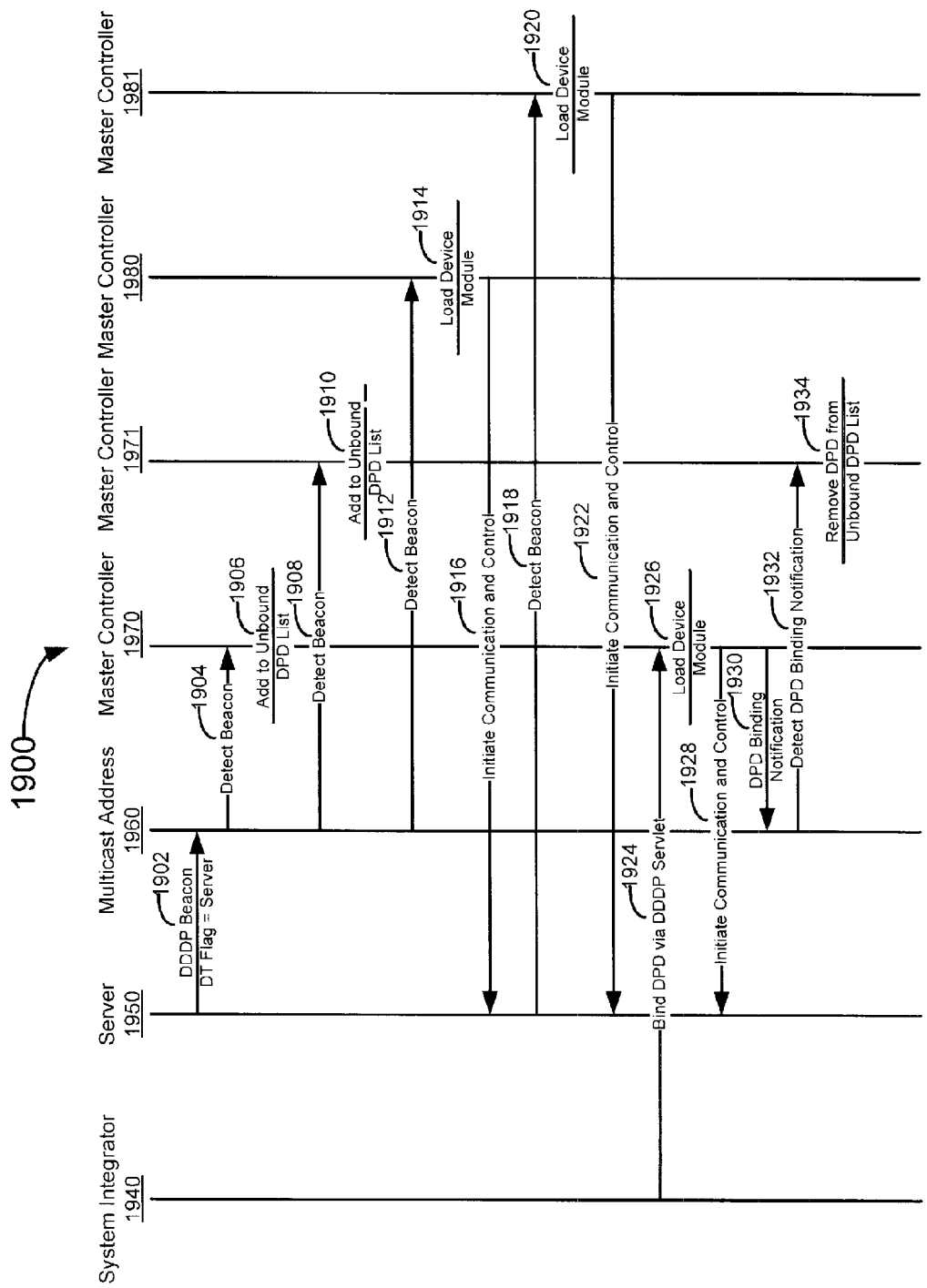
FIG. 19 depicts a diagrammatic representation of a signaling flow of a device discovery and binding routine that facilitates binding a server to multiple masters in accordance with an embodiment.

FIG. 19 depicts a diagrammatic representation of a signaling flow 1900 of a device discovery and binding routine that facilitates binding of a server to multiple masters in accordance with an embodiment. In the illustrative example, assume that master controllers 1970-1971 are implemented in accordance with contemporary master controller configurations and are not capable of recognizing a device Type Flag in a DDDP beacon, and master controllers 1980-1981 are configured according to the disclosed embodiments and are capable of recognizing a device Type Flag in a DDDP beacon. Further assume that server 1950 is implemented according to the disclosed embodiments and is adapted to transmit a DDDP beacon including a device Type Flag that indicates whether the device comprises a DP device or a DP server.

A DPD comprising a DP server 1950 transmits a DDDP beacon that includes a device Type (DT) Flag to a multicast address 1960 (step 1902). In the present example, the device Type Flag is set to a value that indicates the DPD comprises a DP server. Conventionally configured master controller 1970 detects the DDDP beacon at the multicast address (step 1904) and adds the DPD to an unbound DPD list maintained by master controller 1970 (step 1906). Likewise, conventionally configured master controller 1971 detects the DDDP beacon at the multicast address (step 1908) and adds the DPD to an unbound DPD list maintained by master controller 1971 (step 1910).

Master controller 1980 detects the DDDP beacon at the multicast address (step 1912). Master controller 1980 is configured to recognize the DDDP device Type Flag of the DDDP beacon and thus evaluates the DDDP beacon for the device Type Flag. On detection of the DDDP device Type Flag, master controller 1980 evaluates the value of the device Type Flag and determines the device Type Flag indicates the DPD device comprises a DP server. Accordingly, master controller 1980 then loads a device Module for the DPD (step 1914), and may thereafter commence communication and control of the DPD (step 1916). Likewise, master controller 1981 detects the DDDP beacon at the multicast address (step 1918). Master controller 1981 is configured to recognize the DDDP device Type Flag of the DDDP beacon and thus evaluates the DDDP beacon for the device Type Flag. On detection of the DDDP device Type Flag, master controller 1981 evaluates the value of the device Type Flag and determines the device Type Flag indicates the DPD device comprises a DP server. Accordingly, master controller 1981 then loads a device Module for the DPD (step 1920), and may thereafter commence communication and control of the DPD (step 1922).

A system integrator 1940 may access a master controller, e.g., master controller 1970, via a web interface or other suitable communication interface, to explicitly bind the DP server 1950 to the correct conventionally configured master controller (step 1924), e.g., master controller 1970 in the illustrative example. The master controller 1970 may then load the DPD's 1950 Module (step 1926), and thereafter initiate control and communication of the DPD (step 1928). The master controller 1970 then multicasts a DPD binding notification (step 1930) which is then detected by the conventionally configured master controller 1971 (step 1932). The master controller 1971 may then remove DPD 1950 from the unbound DPD list maintained thereby (step 1934).

Thus, conventionally configured master controllers 1970-1971 add the DPD server to their unbound DPD list as they would for any other DPD and thus still require a system integrator to explicitly select the master controller to bind the DPD to a particular master controller. Master controllers implemented in accordance with disclosed embodiments are advantageously able to automatically load a DPD module for a DP server and initiate communication with the server without administrator intervention.

Figure 20:
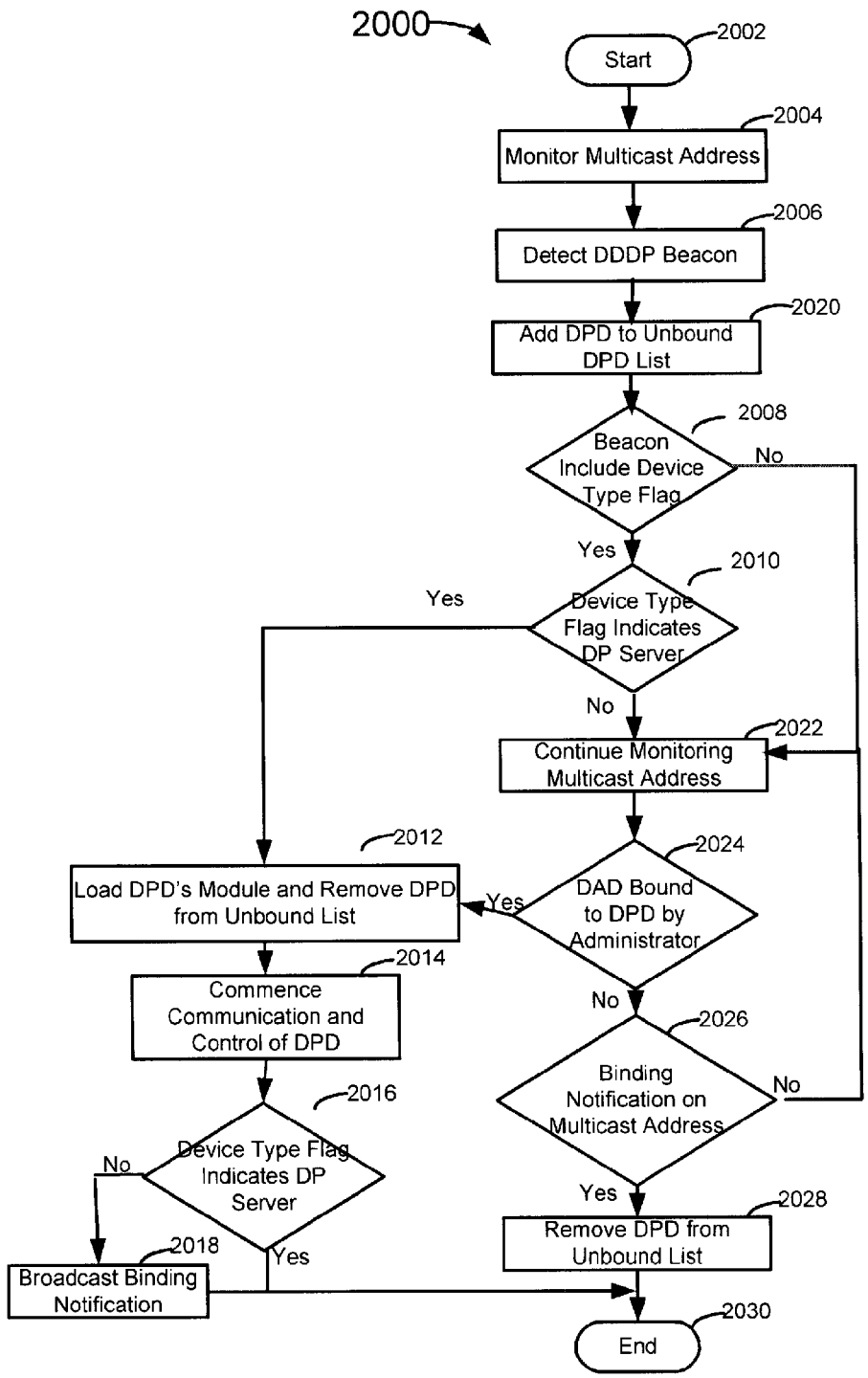
FIG. 20 is a flowchart that depicts a device discovery and binding routine that facilitates binding a server to multiple masters in accordance with an embodiment.

FIG. 20 is a flowchart 2000 that depicts a device discovery and binding routine that facilitates binding a server to multiple masters in accordance with an embodiment. The processing steps of FIG. 20 may be implemented as computer-executable instructions executable by a processing system, such as master controller 1980 depicted in FIG. 19.

The discovery and binding routine is invoked (step 2002), and the master controller 1980 monitors the multicast address on which DDDP beacons are broadcast (step 2004). On detection of a DDDP beacon (step 2006), the master controller adds the DPD to the unbound DPD list (step 2008). An evaluation is then made to determine if the beacon includes a Device Type Flag (step 2010) in accordance with the disclosed embodiments. If no device Type Flag is included in the beacon, processing may then continue to monitor the multicast address (step 2022). Returning again to step 2010, if the beacon includes a Device Type Flag, an evaluation is then made to determine if the Device Type Flag indicates a DP server (step 2012). If so, the master controller may then load the DPD's Module and remove the DPD from the unbound list (step 2014) and may then commence communication with the DPD and control thereof (step 2016) according to the disclosed embodiments. An evaluation may then be made to determine if the Device Type Flag indicates a DP server (step 2018). If not, a binding notification is then broadcast (step 2020) that indicates the DPD is bound thereto, and the device discovery and binding routine cycle may then end (step 2030). If the Device Type Flag indicates a DP server at step 2018, the device discovery and binding routine cycle may then end according to step 2030.

Returning again to step 2012, if the Device Type Flag does not indicate a DP server, the multicast address may continue to be monitored (step 2022), and an evaluation of whether the DAD is bound to a DPD by an administrator may be made (step 2024). If the DAD is bound to a DPD, the DPD's module may then be loaded according to step 2014. If the DAD is not bound to the DPD, the master controller may evaluate whether a binding notification has been broadcast on the multicast address indicating the DPD has been bound to another master controller (step 2026). If the DPD has not been bound to another master controller, the master controller may continue monitoring the broadcast address according to step 2022 until the DAD is bound to the DPD. In the event that a binding notification is detected at step 2026, the master controller 1980 then removes the DPD from the unbound DPD list maintained by the master controller 1980 (step 2028), and the device discovery and binding routine cycle may then end according to step 2030.

Servers may be deployed in large installations, such as universities or large multiple dwelling units, with many installed master controllers system. Inclusion of the device Type Flag in the device discovery beacon provides for automatic discovery of a server and loading of the server's module at the master controller for communication and control of the server without intervention by an administrator.

As described, mechanisms for dynamic device discovery and binding of servers to multiple master controllers are provided. In one implementation, a device discovery beacon that includes a device Type Flag may be broadcast by a dynamic physical device. If the dynamic physical device comprises a server that is configured to bind to multiple master controllers, the dynamic physical device may set the value of the device Type Flag to indicate the dynamic physical device comprises a server. On detection of the beacon, a master controller configured according to disclosed embodiments may evaluate the device Type Flag. Upon determining the device Type Flag indicates the dynamic physical device comprise a server, the master controller may load a device Module for the dynamic physical device and commence communications with the dynamic physical device. In this instance, the master controller advantageously does not broadcast a binding notification thereby allowing other master controllers to bind with the dynamic physical device.

The flowcharts of FIGS. 5,8A-8C, and 20 depict process serialization to facilitate an understanding of disclosed embodiments and are not necessarily indicative of the serialization of the operations being performed. In various embodiments, the processing steps described in FIGS. 5,8A-8C, and 20 may be performed in varying order, and one or more depicted steps may be performed in parallel with other steps. Additionally, execution of some processing steps of FIGS. 5,8A-8C, and 20 may be excluded without departing from embodiments disclosed herein.

The illustrative block diagrams depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the present invention may be implemented in software, hardware, firmware, or a combination thereof. The various elements of the system, either individually or in combination, may be implemented as a computer program product tangibly embodied in a machine-readable storage device for execution by a processing unit. Various steps of embodiments of the invention may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying the aspects of the present invention can be loaded onto a computer. The computer program is not limited to any particular embodiment, and may, for example, be implemented in an operating system, application program, foreground or background process, driver, network stack, or any combination thereof, executing on a single processor or multiple processors. Additionally, various steps of embodiments of the invention may provide one or more data structures generated, produced, received, or otherwise implemented on a computer-readable medium, such as a memory.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method, comprising:
receiving, by a first master controller, a first device discovery beacon from a first control system device;
determining the first device discovery beacon includes a device type flag;
determining a value indicates the first control system device comprises a server configured to bind to multiple master controllers;
loading, by a first master controller, an instance of a device module associated with the first control system device responsive to determining the value;
receiving, by the first master controller, a second device discovery beacon from a second control system device;
determining the second device discovery beacon does not include a device type flag;
adding, by the first master controller, a designation of the second control system device to an unbound dynamic physical device list maintained by the first master controller;
detecting, by the first master controller, a binding notification on a multicast address indicating the second control system device has been bound to another master controller; and
removing, by the first master controller, the designation of the second control system device from the unbound dynamic physical device list.

2. The method of claim 1, further comprising:
receiving, by a second master controller, the first device discovery beacon from the first control system device;
evaluating the beacon for inclusion of the device type flag;
determining the beacon includes the device type flag;
evaluating the value of the device type flag;
determining the value indicates the first control system device comprises the server configured to bind to multiple master controllers; and
loading, by the second master controller, an instance of the device module associated with the first control system device responsive to determining the value indicates the device comprises a server configured to bind to multiple master controllers.

3. The method of claim 1, further comprising:
receiving, by the first master controller, a third device discovery beacon from a second control system device;
evaluating the third device discovery beacon for inclusion of a device type flag;
determining the third device discovery beacon includes the device type flag;
evaluating a value of the device type flag of the third device discovery beacon;
determining the value of the device type flag of the third device discovery beacon indicates the second control system device does not comprise a server configured to bind to multiple master controllers; and
adding, by the first master controller, a designation of the second control system device to an unbound dynamic physical device list maintained by the first master controller.

4. The method of claim 3, further comprising:
receiving, by the first master controller, a directive to bind a dynamic application device associated with the second control system device to the first master controller; and
loading, by the first master controller, an instance of a device module associated with the second control system device responsive to receiving the directive.

5. The method of claim 4, further comprising broadcasting, by the first master controller, a binding notification on a multicast address indicating the second control system device has been bound to the first master controller.

6. The method of claim 1, comprising evaluating at least one of:
the second device discovery beacon for inclusion of the device type flag; and
the value of the device type flag.

7. The method of claim 1, wherein the another master controller is different from the first master controller.

8. The method of claim 1, further comprising commencing communication and control of the first control system device by the first master controller responsive to loading the instance of the device module.

9. A non-transitory computer-readable storage medium having computer-executable instructions for execution by a processing system, the computer-executable instructions that, when executed, cause the processing system to:
receive, by a first master controller, a first device discovery beacon from a first control system device;
determine the beacon includes the device type flag;
determine a value of the device type flag indicates the first control system device comprises a server configured to bind to multiple master controllers;
load, by the first master controller, an instance of a device module associated with the first control system device responsive to determining the value;
receive, by the first master controller, a second device discovery beacon from a second control system device;
determine the second device discovery beacon does not include the device type flag;
add, by the first master controller, a designation of the second control system device to an unbound dynamic physical device list maintained by the first master controller;
detect, by the first master controller, a binding notification on a multicast address indicating the second control system device has been bound to another master controller; and
remove, by the first master controller, the designation of the second control system device from the unbound dynamic physical device list.

10. The non-transitory computer-readable storage medium of claim 9, further comprising instructions that, when executed, cause the processing system to:
receive, by a second master controller, the first device discovery beacon from the first control system device;
evaluate the beacon for inclusion of the device type flag;
determine the beacon includes the device type flag;
evaluate the value of the device type flag;
determine the value indicates the first control system device comprises the server configured to bind to multiple master controllers; and
load, by the second master controller, an instance of the device module associated with the first control system device responsive to determining the value indicates the device comprises a server configured to bind to multiple master controllers.

11. The non-transitory computer-readable storage medium of claim 9, further comprising instructions that, when executed, cause the processing system to:
receive, by the first master controller, a third device discovery beacon from a second control system device;
evaluate the third device discovery beacon for inclusion of a device type flag;
determine the third device discovery beacon includes the device type flag;
evaluate a value of the device type flag of the third device discovery beacon;
determine the value of the device type flag of the third device discovery beacon indicates the second control system device does not comprise a server configured to bind to multiple master controllers; and
add, by the first master controller, a designation of the second control system device to an unbound dynamic physical device list maintained by the first master controller.

12. The non-transitory computer-readable storage medium of claim 11, further comprising instructions that, when executed, cause the processing system to:
receive, by the first master controller, a directive to bind a dynamic application device associated with the second control system device to the first master controller; and
load, by the first master controller, an instance of a device module associated with the second control system device responsive to receiving the directive.

13. The non-transitory computer-readable storage medium of claim 12, further comprising instructions that, when executed, cause the processing system to broadcast, by the first master controller, a binding notification on a multicast address indicating the second control system device has been bound to the first master controller.

14. The non-transitory computer-readable storage medium of claim 9, further comprising instructions that, when executed, cause the processing system to evaluate at least one of:
- the second device discovery beacon for inclusion of the device type flag; and
- the value of the device type flag.

15. The non-transitory computer-readable storage medium of claim 9, wherein the another master controller is different from the first master controller.

16. A system, comprising:
- a first dynamic physical device that comprises a server configured to bind to multiple master controllers;
- a first master controller communicatively coupled with the first dynamic physical device that comprises a first instance of a dynamic application device corresponding to the first dynamic physical device; and
- a second master controller communicatively coupled with the first dynamic physical device that comprises a second instance of the dynamic application device that corresponds to the first dynamic physical device, wherein the first dynamic physical device broadcasts a first device discovery beacon that comprises a device type flag having a value that indicates the first dynamic physical device comprises a server, wherein the first master controller and the second master controller receive the first device discovery beacon, wherein the first master controller loads a first instance of a device module associated with the first dynamic physical device responsive to a determination that the value indicates the first dynamic physical device comprises a server, and wherein the second master controller loads a second instance of the device module responsive to a determination that the value indicates the first dynamic physical device comprises a server, wherein the first master controller detects a binding notification on a multicast address that indicates the second dynamic physical device has been bound to the second master controller and the first master controller removes the designation of the second dynamic physical device from the unbound dynamic physical device list.

17. The system of claim 16, wherein the first master controller receives a third device discovery beacon from a second dynamic physical device, evaluates the third device discovery beacon for inclusion of a device type flag, determines the third device discovery beacon includes the device type flag, evaluates a value of the device type flag of the third device discovery beacon, determines the value of the device type flag of the third device discovery beacon indicates the second dynamic physical device does not comprise a server configured to bind to multiple master controllers, and adds a designation of the second dynamic physical device to an unbound dynamic physical device list maintained by the first master controller.

18. The system of claim 17, wherein the first master controller receives a directive to bind an instance of a dynamic application device that corresponds to the second dynamic physical device to the first master controller and loads an instance of a device module associated with the second dynamic physical device responsive to a receipt of the directive.

19. The system of claim 16, wherein the first master controller and the second master controller receive the first device discovery beacon and respectively evaluate the device type flag value.

20. The system of claim 16, wherein the first master controller and the second master controller receive the second device discovery beacon and respectively evaluate the device type flag value.

* * * * *